US011799860B2

(12) United States Patent
Shah et al.

(10) Patent No.: US 11,799,860 B2
(45) Date of Patent: Oct. 24, 2023

(54) CLIENT FORWARDING POLICIES FOR ZERO TRUST ACCESS FOR APPLICATIONS

(71) Applicant: Zscaler, Inc., San Jose, CA (US)

(72) Inventors: Kunal Shah, San Jose, CA (US); John A. Chanak, Saratoga, CA (US); David Creedy, Los Gatos, CA (US)

(73) Assignee: Zscaler, Inc., San Jose, CA (US)

( * ) Notice: Subject to any disclaimer, the term of this patent is extended or adjusted under 35 U.S.C. 154(b) by 274 days.

(21) Appl. No.: 17/102,592

(22) Filed: Nov. 24, 2020

(65) Prior Publication Data
US 2021/0336959 A1 Oct. 28, 2021

Related U.S. Application Data

(63) Continuation-in-part of application No. 16/858,798, filed on Apr. 27, 2020, now Pat. No. 11,363,022.

(51) Int. Cl.
*H04L 9/40* (2022.01)
*H04L 67/10* (2022.01)
*H04L 67/60* (2022.01)

(52) U.S. Cl.
CPC .............. *H04L 63/10* (2013.01); *H04L 67/10* (2013.01); *H04L 67/60* (2022.05)

(58) Field of Classification Search
CPC .......... H04L 63/10; H04L 67/60; H04L 67/10
See application file for complete search history.

(56) References Cited

U.S. PATENT DOCUMENTS

| 10,375,024 | B2 | 8/2019 | Foxhoven et al. |
| 10,616,180 | B2 | 4/2020 | Chanak et al. |
| 2006/0089938 | A1* | 4/2006 | Leonard .................. G06F 16/22 |
| 2014/0007222 | A1* | 1/2014 | Qureshi .................. H04L 67/10 |
| | | | 726/16 |
| 2015/0288718 | A1* | 10/2015 | Pimenova .......... G06Q 30/0201 |
| | | | 726/1 |
| 2017/0251368 | A1* | 8/2017 | Ross .................... H04L 63/0892 |
| 2017/0310709 | A1 | 10/2017 | Foxhoven et al. |
| 2018/0113807 | A1 | 4/2018 | Foxhoven et al. |
| 2019/0141015 | A1* | 5/2019 | Nellen ................ H04L 63/0272 |
| 2019/0312860 | A1* | 10/2019 | Dykes ..................... H04L 63/10 |
| 2020/0084295 | A1* | 3/2020 | Hayward .............. H04L 51/063 |
| 2020/0259831 | A1 | 8/2020 | Pampati et al. |
| 2020/0336913 | A1 | 10/2020 | Pampati et al. |
| 2021/0152529 | A1* | 5/2021 | Ruppin ............... H04L 63/0428 |
| 2022/0318416 | A1* | 10/2022 | Olden .................... G06F 16/256 |

FOREIGN PATENT DOCUMENTS

EP 3 247 082 A1 11/2017

* cited by examiner

*Primary Examiner* — Harris C Wang
(74) *Attorney, Agent, or Firm* — Baratta Law PLLC; Lawrence A. Baratta, Jr.; Ryan Odessa

(57) ABSTRACT

Systems and methods include providing a user interface to an administrator associated with a tenant of a cloud-based system, wherein the tenant has a plurality of users each having an associated user device; receiving a plurality of client forwarding policies for the plurality of users, wherein each client forwarding policy of the client forwarding policies define rules related to how application requests from the plurality of users are forwarded for zero trust access; and providing the rules to corresponding user devices of the plurality of users.

20 Claims, 23 Drawing Sheets

CLIENT FORWARDING POLICIES FOR ZERO TRUST ACCESS FOR APPLICATIONS

CROSS-REFERENCE TO RELATED APPLICATION(S)

The present patent application/patent is a continuation-in-part of U.S. patent application Ser. No. 16/858,798, filed Apr. 27, 2020, and entitled "Use of DHCP for location information of a user device for automatic traffic forwarding," the contents of each are incorporated by reference herein in their entirety.

FIELD OF THE DISCLOSURE

The present disclosure relates generally to networking and computing. More particularly, the present disclosure relates to systems and methods for client forwarding policies for zero trust access for applications.

BACKGROUND OF THE DISCLOSURE

The traditional view of an enterprise network (i.e., corporate, private, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA) and Zscaler Private Access (ZPA), available from Zscaler, Inc., the applicant and assignee of the present application.

ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

An aspect of this zero trust access service is a need to install client forwarding policies on user devices. Disadvantageously, there can be a large amount of data for the client forwarding policies, making it impractical to install all of the possible client forwarding policies on a user device. Further, the concept of zero trust recognizes the goal of limiting information sharing where it is not necessary, i.e., why install client forwarding policies that are not required.

BRIEF SUMMARY OF THE DISCLOSURE

The present disclosure relates to systems and methods for client forwarding policies for zero trust access for applications. A zero trust access service operates between a cloud-based system, user devices, and applications. The client forwarding policies define the forwarding of traffic in the zero trust access service between the user devices and the applications via the cloud-based system. The present disclosure includes selective download/installation of client forwarding policies on a given user device based on associated access privileges, authorized applications, etc., for a user of the user device. Advantageously, this selective download/installation of client forwarding policies provide increased security, such as preventing a Domain Name System (DNS) leak, supports the zero trust access of application at remote locations while local application access is bypassed, and enables the use of zero trust access of a trusted network.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

FIG. 24 is a screenshot of editing a particular client forwarding policy; and

DETAILED DESCRIPTION OF THE DISCLOSURE

Again, the present disclosure relates to systems and methods for client forwarding policies for zero trust access for applications. A zero trust access service operates between a cloud-based system, user devices, and applications. The client forwarding policies define the forwarding of traffic in the zero trust access service between the user devices and the applications via the cloud-based system. The present disclosure includes selective download/installation of client forwarding policies on a given user device based on associated access privileges, authorized applications, etc., for a user of the user device. Advantageously, this selective download/installation of client forwarding policies provide increased security, such as preventing a Domain Name System (DNS) leak, supports the zero trust access of application at remote locations while local application access is bypassed, and enables the use of zero trust access of a trusted network.

Example Cloud-Based System Architecture

Figure 1:
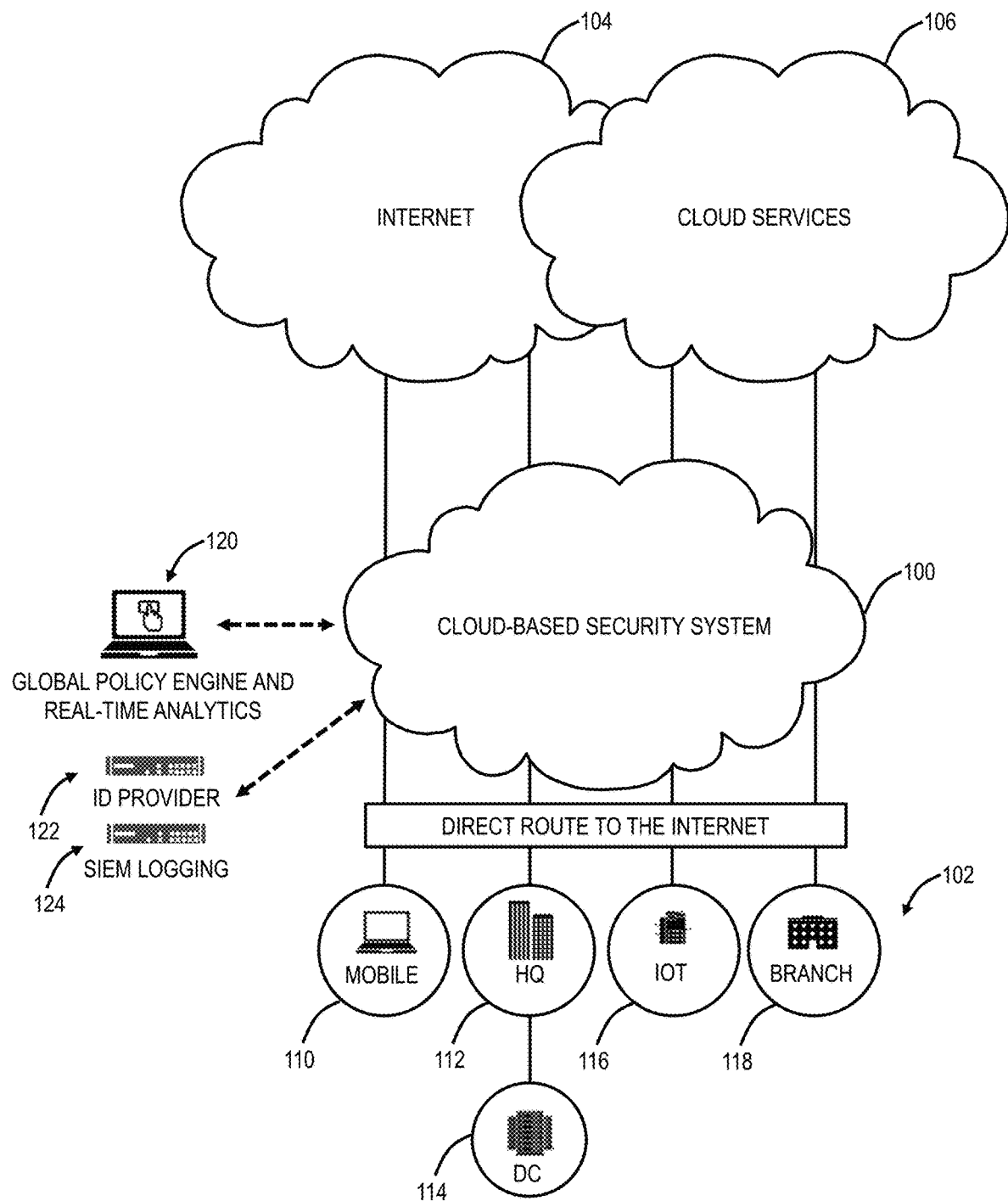
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
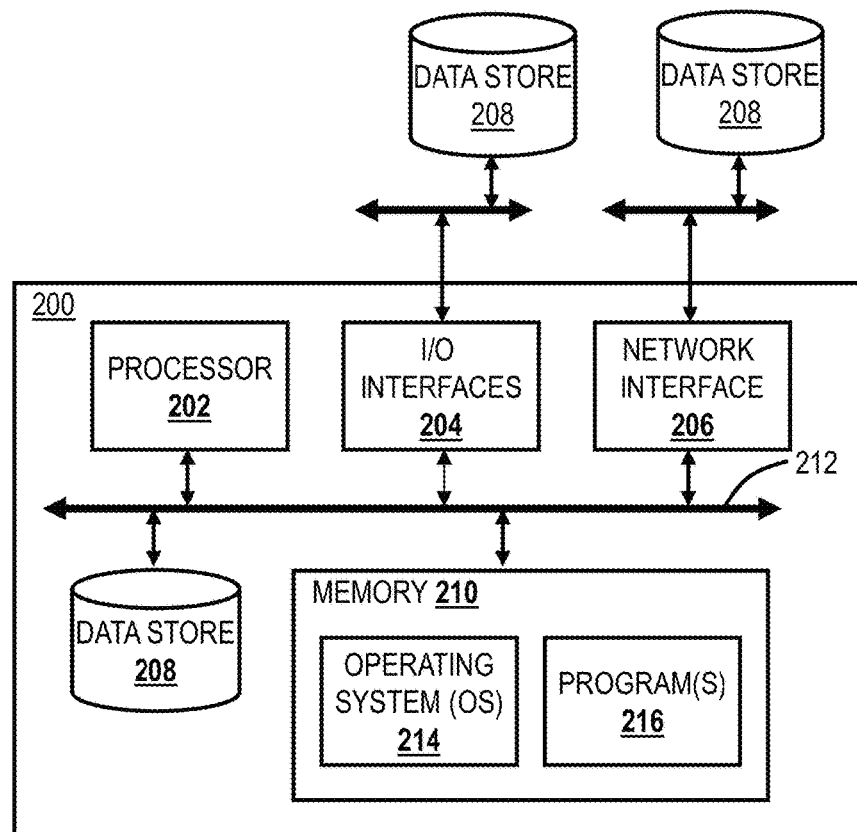

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
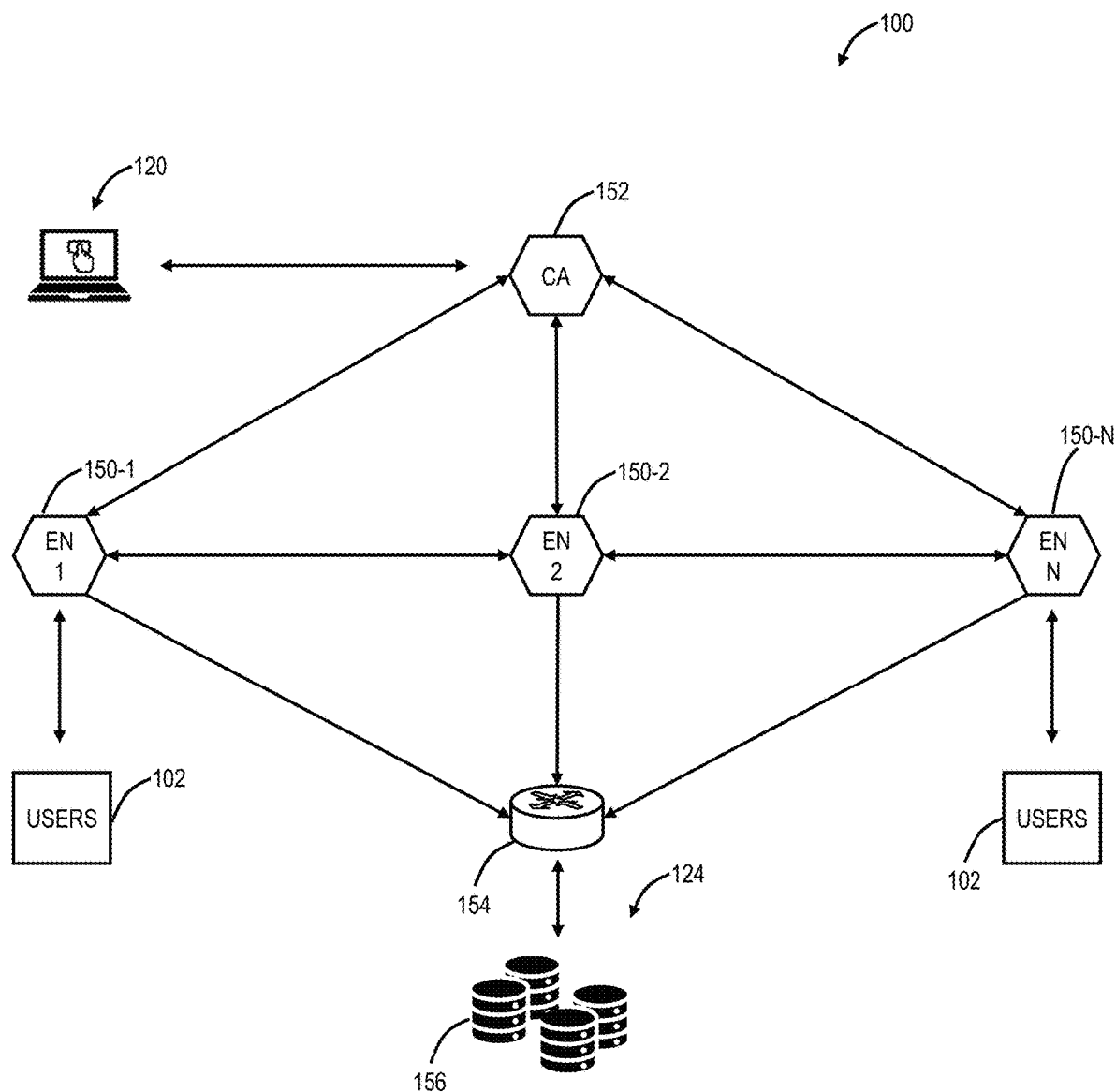
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200.

Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
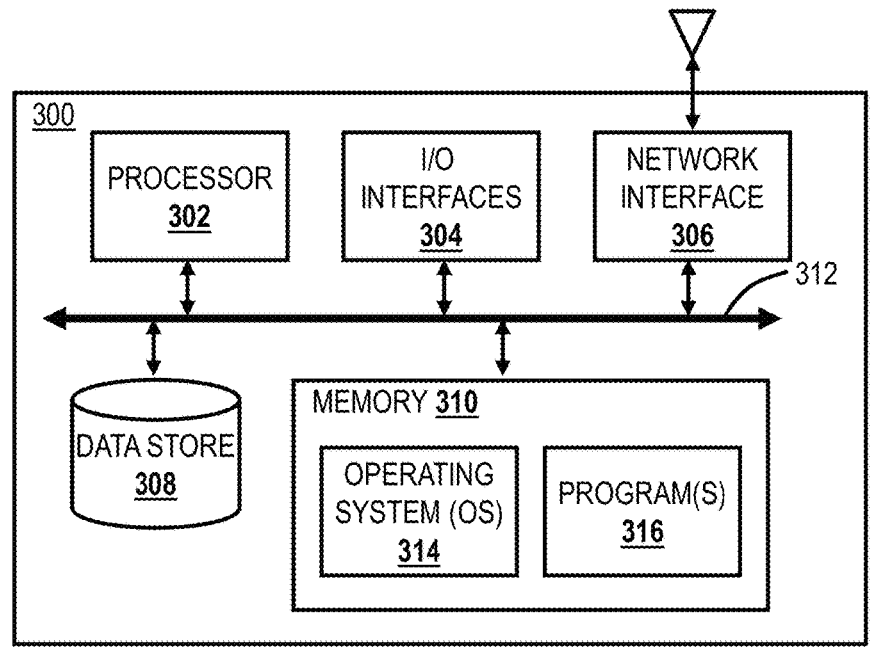

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The present disclosure relates to mobile devices, which are one subset of the user device 300. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

User Device Application for Traffic Forwarding and Monitoring

Figure 5:
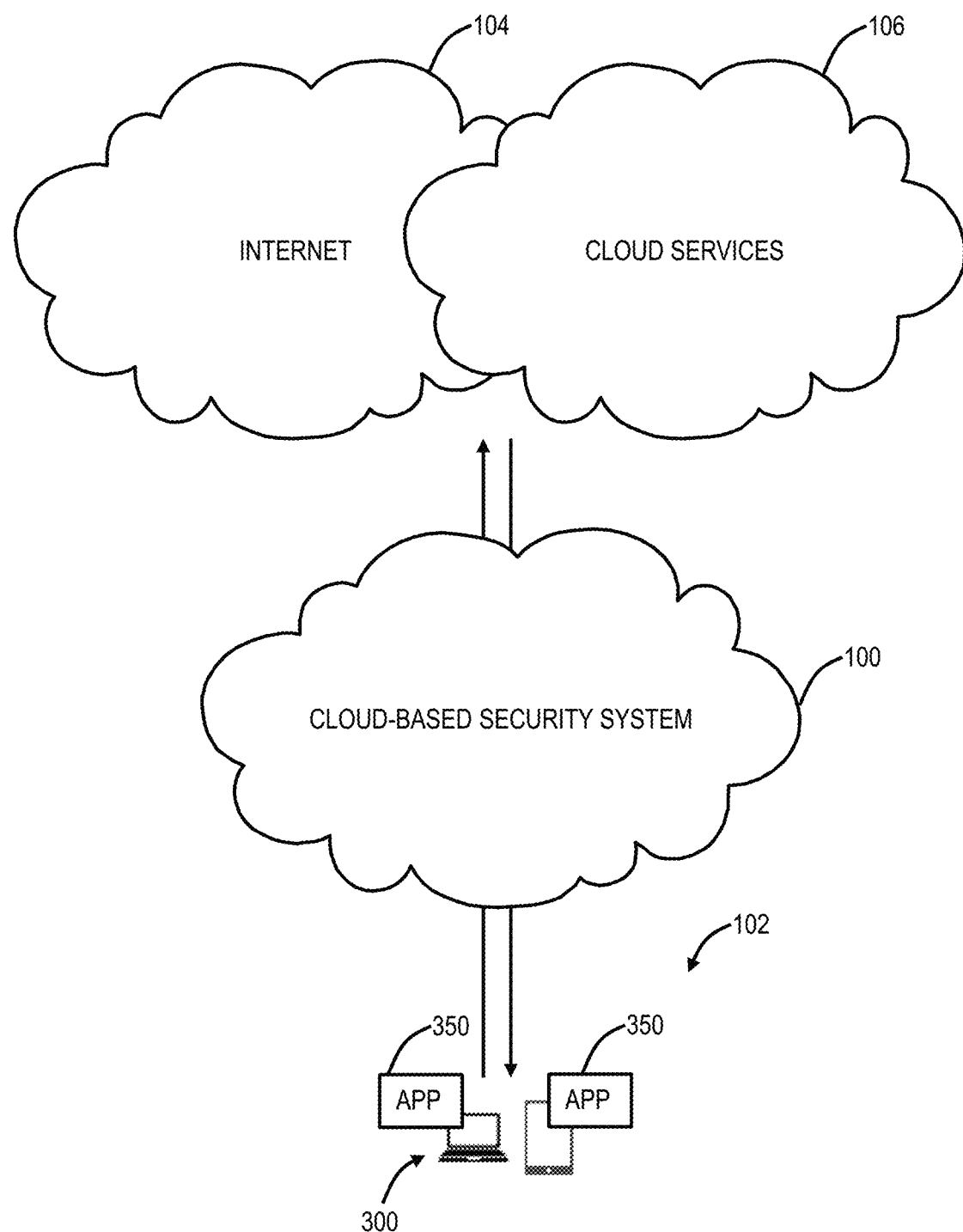
FIG. 5 is a network diagram of the cloud-based system illustrating an application on user devices with users configured to operate through the cloud-based system.

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for a seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

Zero Trust Network Access Using the Cloud-Based System

Figure 6:
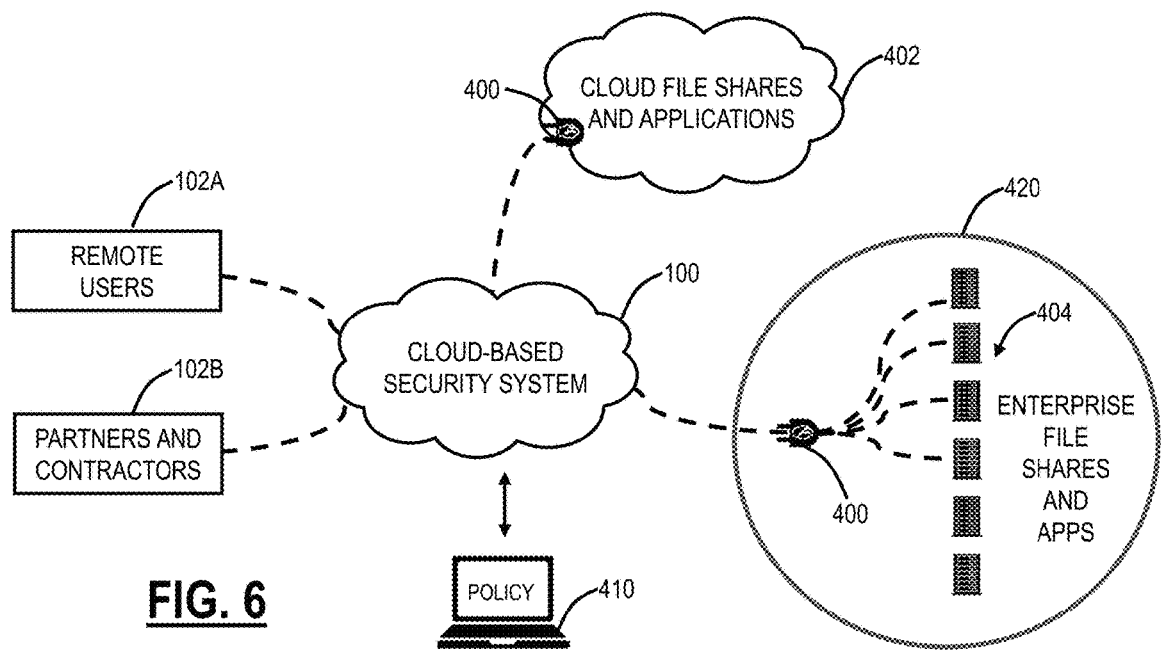
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 420 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy 410, and the cloud-based system 100 to stitch the applications 402, 404 and the software connectors 400 together, on a per-user, per-application basis.

With the virtual private access, users can only see the specific applications 402, 404 allowed by the policy 410. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy, because the virtual private access is a service offering to end-users and enterprises. FIG. 5 can include the ZPA service from Zscaler, Inc.

Digital Experience Monitoring

Figure 7:
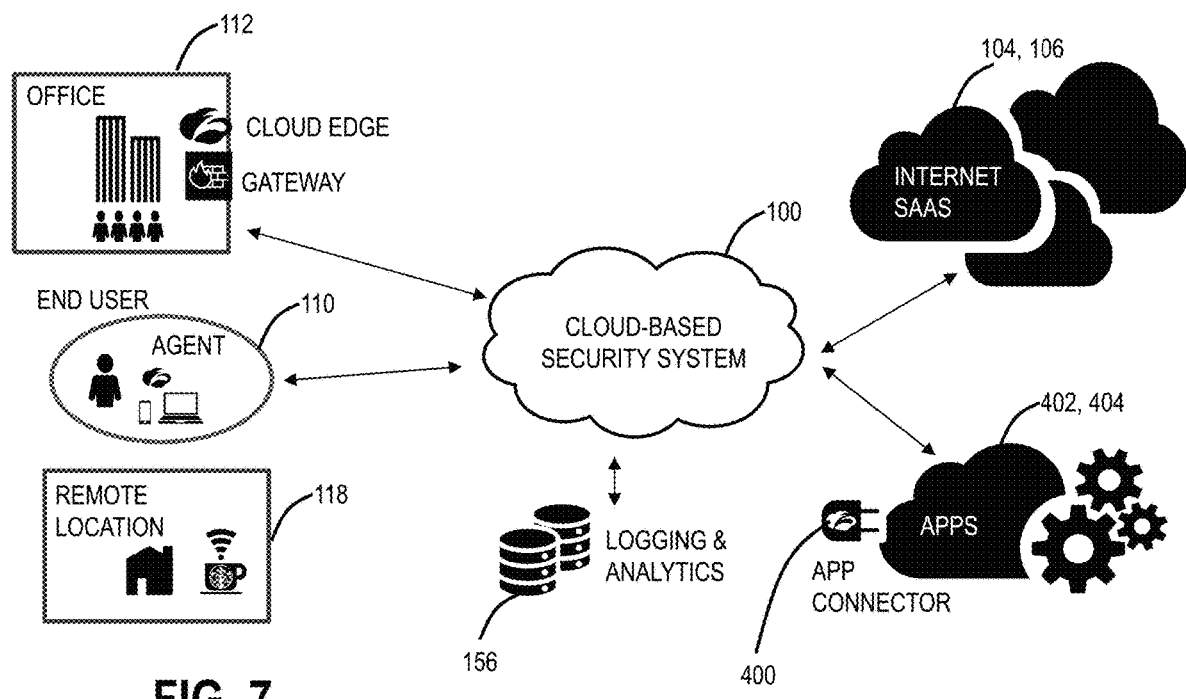
FIG. 7 is a network diagram of a connector application and associated connectivity and functionality with the cloud-based system.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring.

In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Connector Application

Figure 8:
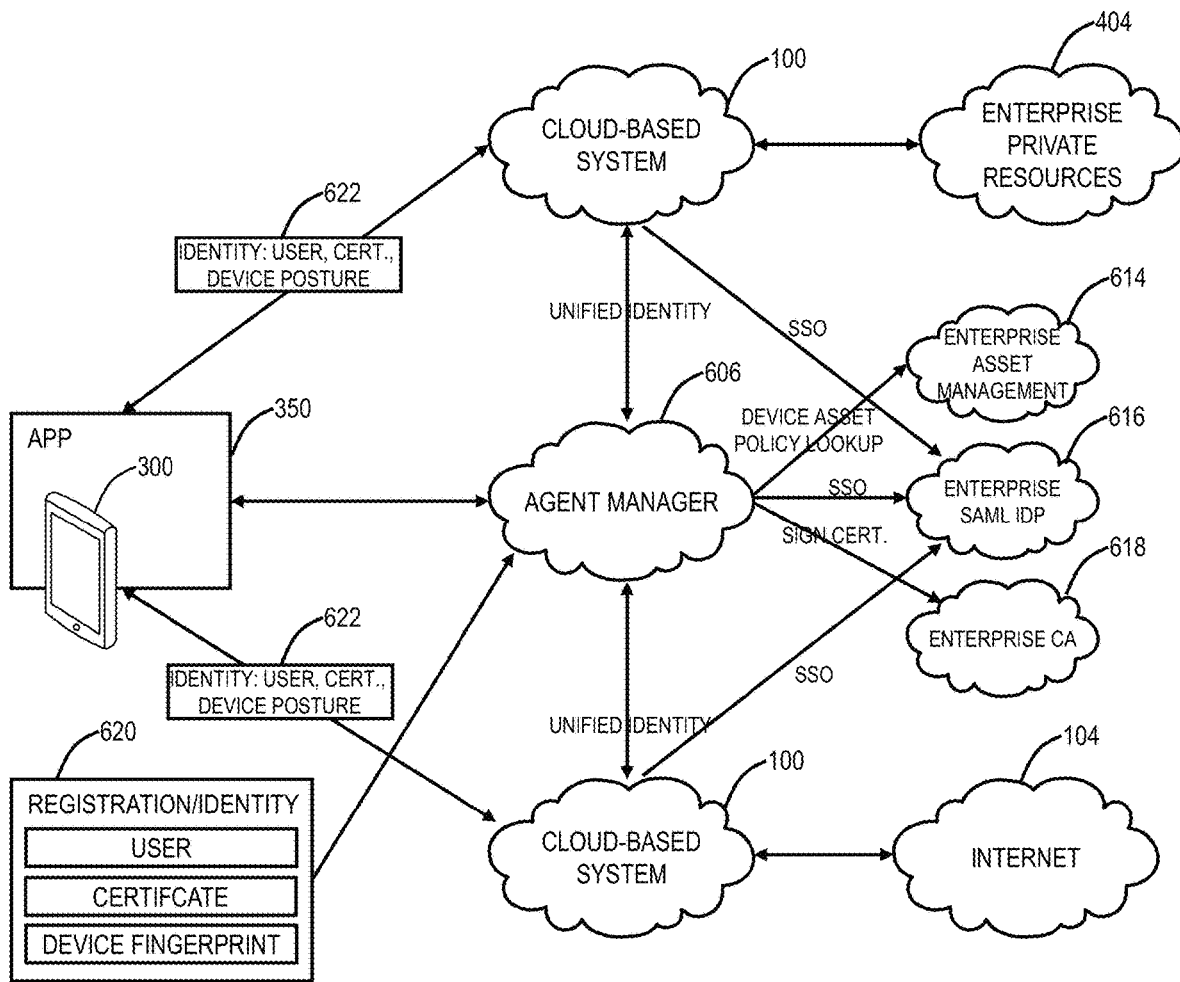
FIG. 8 is a network diagram of example workflow of the connector application.

FIG. 8 is a network diagram of the use of the application 350 as a connector application and associated connectivity and functionality with the cloud-based system 100. Again, the connector application 350 is executed on a user device 300. The connector application 350 dynamically learns all available services, adapts to changing network environments, and provides a seamless and secure network resource access to Internet and darknet hosted applications. This is achieved through dynamic evaluation of network conditions, enrollment to individual services, learning individual service protocols, creating a link-local network on the user device 300, and establishing multiple secure tunnels to cloud services over this local network.

The connector application 350 is communicatively coupled to an agent manager cloud 606, as well as the cloud-based system 100. The connector application 350 enables communication to enterprise private resources on the enterprise network 420 via the cloud-based system 100 and to the Internet 104 via the cloud-based system 100. The agent manager cloud 606 can communicate with enterprise asset management 614, an enterprise Security Assertion Markup Language (SAML) Identity Provider (IDP) 616, and an enterprise Certificate Authority (CA) 618. The user device 300 and the connector application 350 can perform a registration/identity 620 process through the agent manager cloud 606 where the user identity, the user's certificates, and a device fingerprint can uniquely identify the user device 300. Once registered, the connector application 350 has an identity 622, which can include the user, certificates, device posture, etc. and which is shared with the cloud-based system 100.

The connector application 350 operates on a client-server model where an IT admin enables appropriate services for end users at a Cloud Administration Server (CAS), which can be part of the agent manager cloud 606, namely the enterprise asset management 614. Every client can make a unicast request to the agent manager cloud 606 (e.g., CAS) to discover all enabled services. On acknowledging the response, the client issues a request to authenticate to each service's cloud Identity Providers, the enterprise SAML IDP 616. Authentication can be multi-factor depending upon the nature of the service. On successful authentication, the server contacts Mobile Device Management (MDM) or Inventory management provider to define access control rights for the user device 300. Post authorization, the user device 300 is successfully enrolled in the agent manager cloud 606, which tracks and monitors all behavior of the user device 300.

Post-enrollment, the user device 300 creates a link local network with a specific IP configuration, opens a virtual network interface to read and write packets to create secure tunnels to available services through the cloud-based system 100. On network changes, the user device 300 dynamically evaluates reachability to pre-configured domains and depending upon the result, it appropriately transitions all network tunnels, thus providing a seamless experience to the end user. Further, the user device 300 also intelligently learns the conditions which are appropriate for setting up network tunnels to cloud services depending upon several network heuristics such as reachability to a particular cloud service.

Connector Application—Functionality

Generally, the connector application 350 supports two broad functional categories—1) dynamic service discovery and access controls and 2) service availability. The dynamic service discovery and access controls include service configuration by the administrator, service discovery by the user device 300, service acknowledgment and authentication, service authorization and enrollment, and the like. For service configuration by the administrator, the IT admin can provide cloud service details at a centralized knowledge server, such as part of the agent manager cloud 606, the enterprise asset management 614, etc. The cloud service details include the service type (e.g., Internet/intranet), network protocol, identity provider, server address, port, and access controls, etc.

For service discovery by the user device 300, the user device 300 can issue a network request to a known Cloud Administrative Server (CAS) in the agent manager cloud 606 to discover all enabled services for a user. If a specific cloud server is not known a priori, the user device 300 can broadcast the request to multiple clouds, e.g., through the agent manager cloud 606 communicating to the enterprise asset management 614, the enterprise SAML IDP 616, and the enterprise CA 618.

For the service acknowledgment and authentication, the user device 300 acknowledges the response of service discovery and initiates the authentication flow. The user device 300 learns the authentication protocol through the service discovery configuration and performs authentication of a configured nature at the enterprise SAML IDP 616. For the service authorization and enrollment, post successful authentication, the CAS authorizes the user device 300, and fetches the access control information by contacting an MDM/Inventory Solutions Provider. Depending upon the user context and the nature of access, the CAS enrolls the user device 300 into several cloud services and informs the cloud services that the user has been enrolled for access.

The service availability includes link local network setup, a traffic interceptor, and dynamic traffic forwarding tunnels to authorized services. The link-local network setup, post-enrollment, has the user device 300 create a local network on the user device 300 itself to manage various networking functionalities. For the traffic interceptor, the user device 300 intercepts and evaluates all Internet traffic. Allowed traffic is tunneled to the cloud services such as in the cloud-based system 100, whereas the rest of the traffic is denied as per enterprise policies. For the dynamic traffic forwarding tunnels to authorized services, depending upon the evaluation, the user device 300 splits the traffic into the different tunnel to individual cloud services such as in the cloud-based system 100.

The connector application 350 is a single application that provides secure connectivity to the Internet 104 and darknet hosted applications, such as the enterprise private resources in the enterprise network 420. The connector application 350 communicates securely to the agent manager cloud 606, which is controlled by an IT admin. The connector application 350 learns available services and authenticates with each service. Post proper enrollment, the connector application 350 securely connects to cloud services by means of network tunnels.

Connector Application—Workflow

Figure 9:
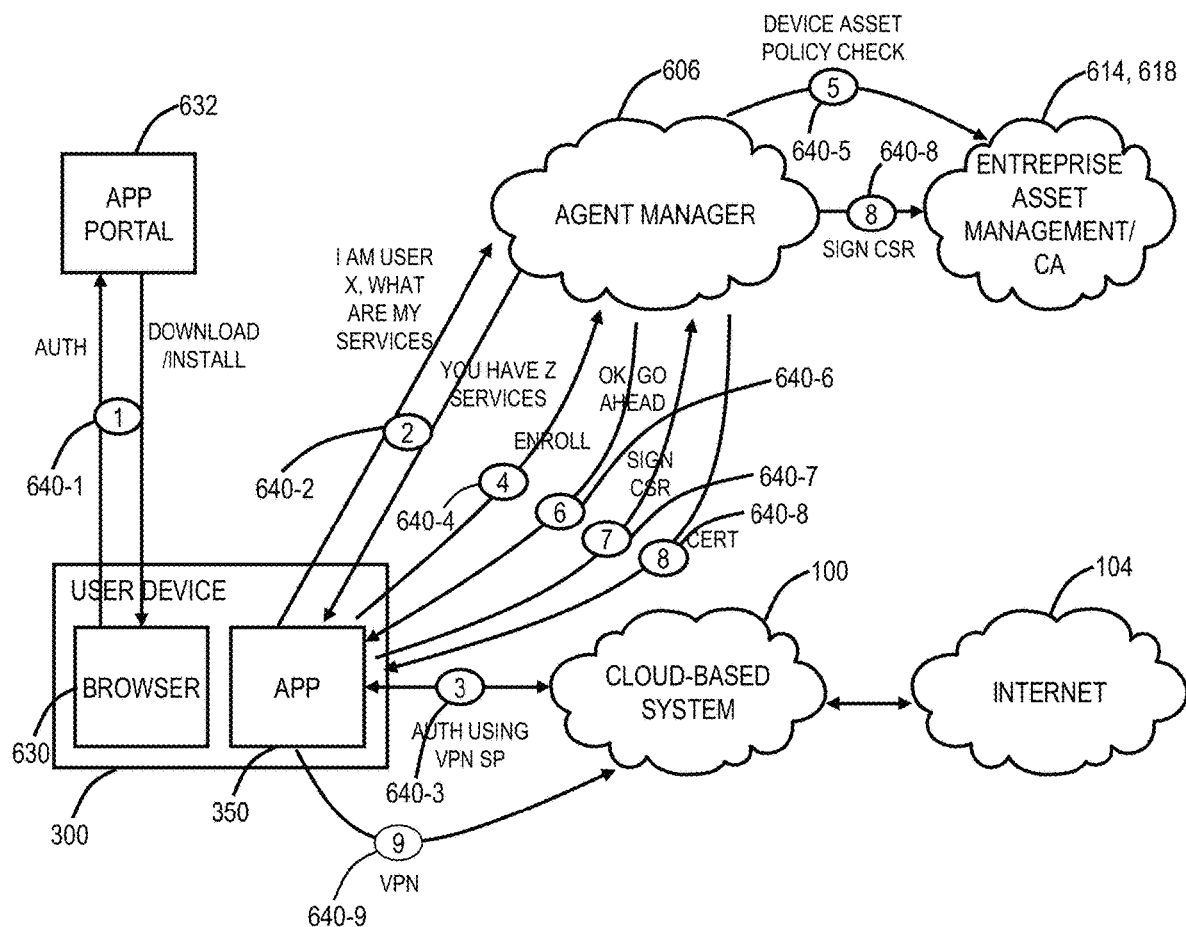
FIG. 9 is a flow diagram of an event sequence associated with the connector application.

FIG. 9 is a network diagram of the example workflow of the connector application 350. The user device 300 again executes the connector application 350, as well as a browser 630 (or some other application requesting network services). First, the user device 300 includes authentication through an application portal 632 and download/install of the connector application 350 therefrom (step 640-1). Note, the application portal 632 can be a website, Apple's app store, Google Play, Windows Store, etc. Once installed, the connector application 350 communicates to the agent manager cloud 606 communicating identity and asking for available services ("I am User X, what are my services?") and the agent manager cloud 606 responds with the available services ("You have Z services") (step 640-2).

Next, the connector application 350 includes authentication using a VPN Service Provider (SP) with the cloud-based system 100 (step 640-3). The connector application 350 next enrolls the user device 300 through the agent manager cloud 606 (step 640-4). The agent manager cloud 606 performs a device asset policy check with the enterprise asset management 614 (step 640-5). The agent manager cloud 606, upon the successful check, provides the connector application 350 an affirmative response (step 640-6). The connector application 350 sends a Certificate Signing Request (CSR) to the agent manager cloud 606 (step 640-7), and the agent manager cloud 606 sends the CSR request to the enterprise CA, and the certificate is returned to the connector application 350 (step 640-8). Finally, the connector application 350 enables VPN connectivity to the cloud-based system 100 (step 640-9).

Figure 10:
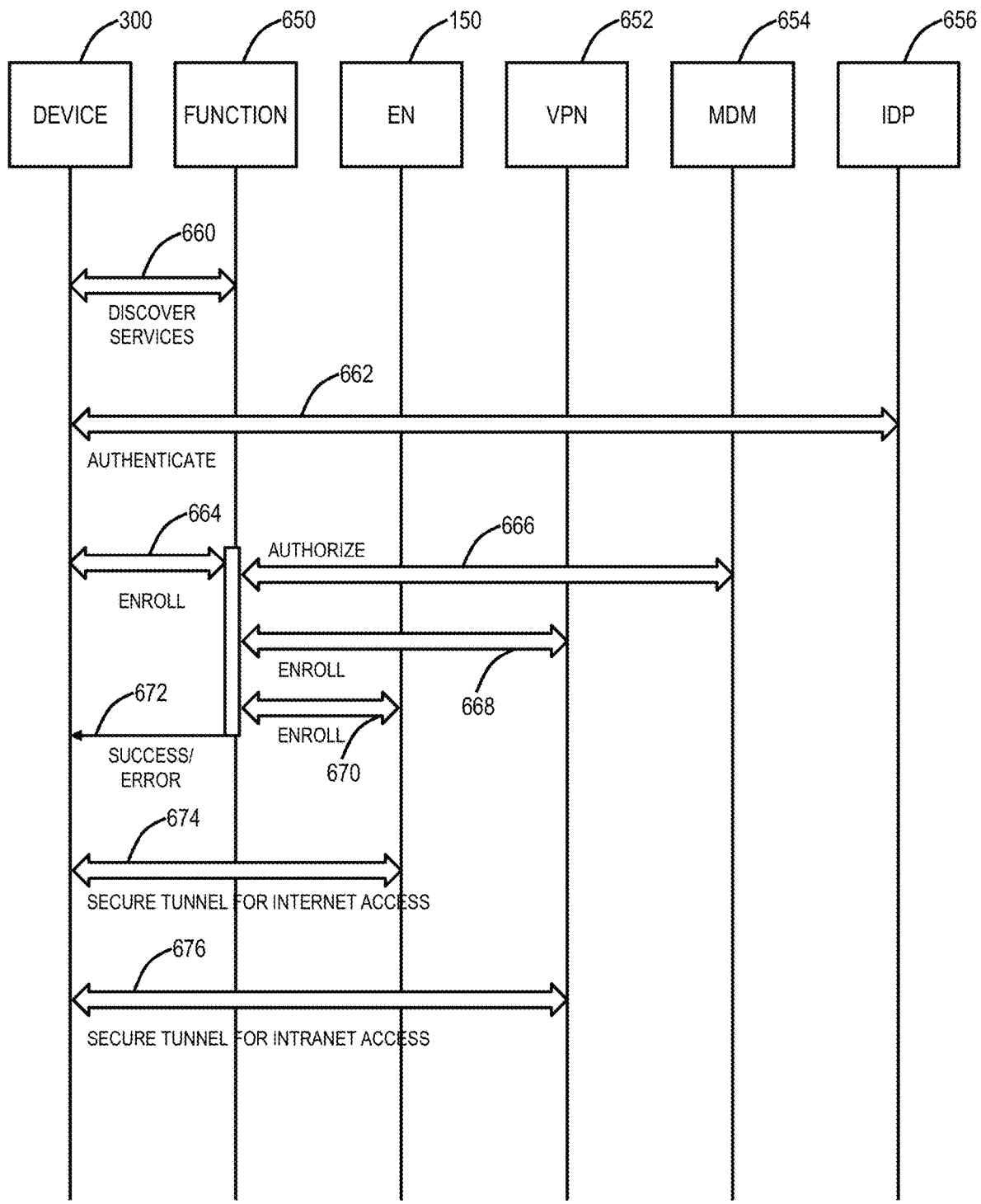
FIG. 10 is a logical diagram of functional components of the connector application.

FIG. 10 is a flow diagram of an event sequence associated with the connector application 350. The event sequence is shown between the user device 300 executing the connector application 350, a mobile admin function 650 such as implemented through the agent manager cloud 606, an enforcement node 150, a VPN node 652 such as through the cloud-based system 100, an MDM function 654 such as through the enterprise asset management 614, and an IDP function 656 such as through the enterprise SAML IDP 616. The user device 300 discovers services with the mobile admin function 650 (step 660), and the user device 300 is authenticated by the IDP function 656 (step 662). The user device 300 enrolls in discovered services through the mobile admin function 650 (step 664).

The mobile admin function 650 is configured to authorize the services with the MDM function 654 (step 666), enroll in the services through the VPN node 652 (step 668), and the enforcement nodes 150 (step 670). A success/error is provided by the mobile admin function 650 to the user device 300 (step 672). Subsequently, the user device 300, through the connector application 350, accesses the services such as a secure tunnel for internet access through the enforcement nodes 150 (step 674) or a secure tunnel for intranet access through the VPN node 652 (step 676).

Connector Application—Architecture

Figure 11:
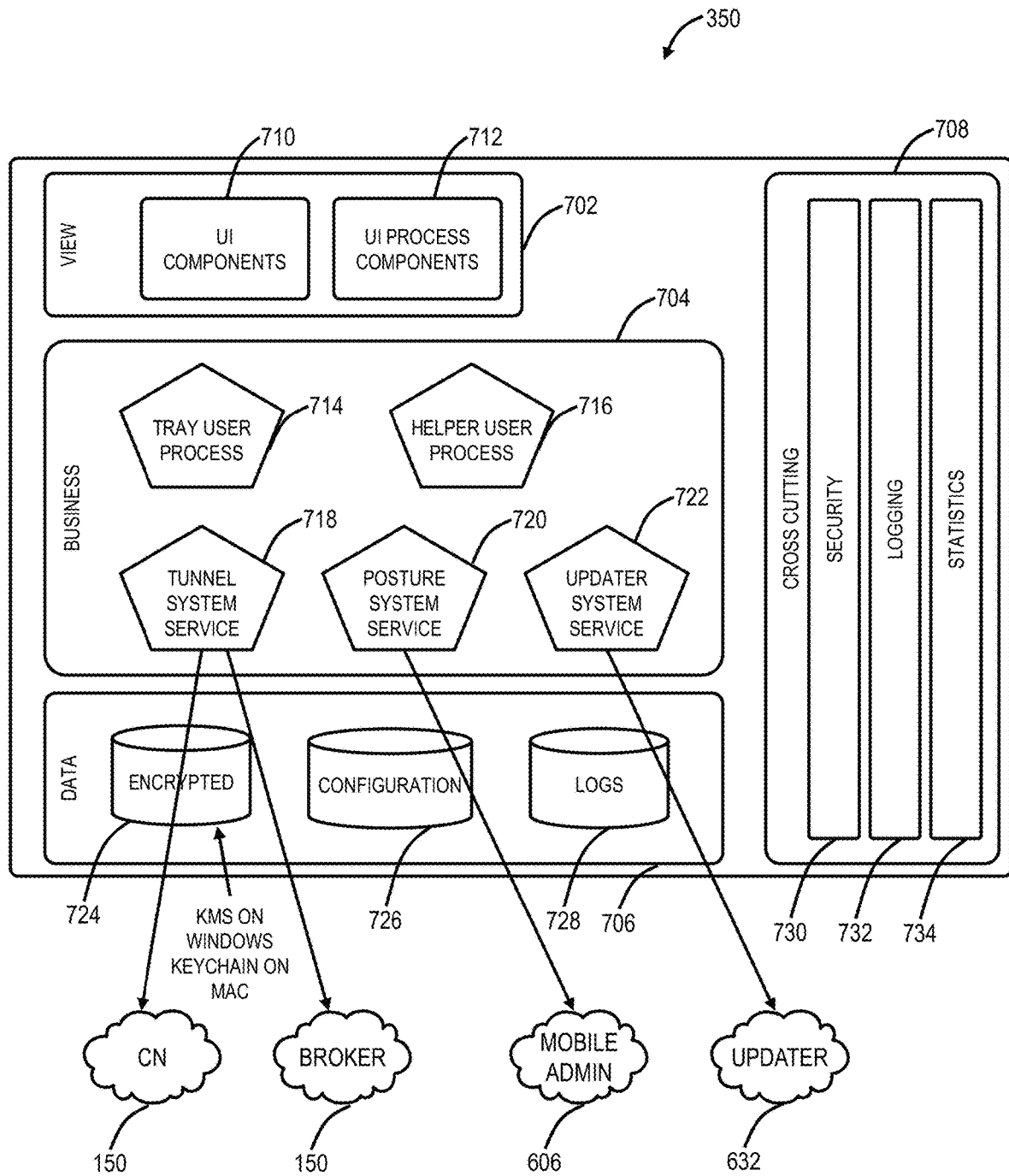
FIG. 11 is a flowchart of a proxy authentication process to the cloud-based system.

FIG. 11 is a logical diagram of the functional components of the connector application 350. The connector application 350 is configured to operate on the mobile user device 300. The cloud-based system 100 can provide Internet security as well as cloud-based remote access to enterprise internal resources through a VPN. These cloud services are designed and well suited for road warriors. Road warriors are the users who are accessing the Internet 104 and enterprise internal services from outside the corporate physical network perimeter. These are the users 102 who are accessing the Internet 104 and Enterprise resources from home, airports, coffee shops, and other external unsecured hotspots.

The connector application 350 provides authenticated and encrypted tunnels from road warrior devices 300 and, in some use cases, it even needs to be enforceable so that end users cannot disable the connector application 350. The VPN, which is the remote access service, also needs authenticated and encrypted tunnel from road warrior user devices 300. Both of these solutions also need to provide feedback to the end user in the event that access was blocked due to security or compliance reasons. The following describes the architecture and design of the connector application 350, including an endpoint client architecture, backend changes, auto-update, and integration with the cloud-based system 100.

The connector application 350 includes logical components including view components 702, business processes and services 704, data 706, and cross-cutting functions 708. The view components 702 include User Interface (UI) components 710 and UI process components 712. The business processes and services 704 include a tray user process 714, a helper user process 716, a tunnel system service 718, a posture system service 720, and an updater system service 722. The data 706 includes encrypted data 724, configuration data 726, and logs 728. The cross-cutting functions 708 are across the view components 702, the business processes and services 704, and the data 706 and include security 730, logging 732, and statistics 734.

The connector application 350 has a useful goal of simplified provisioning of the proxy (for security through the cloud-based system 100 to the Internet 104) and the VPN (for access through the cloud-based system 100 to the enterprise private resources in the enterprise network 420). That is, the connector application 350 allows the use of the cloud-based system 100 as a proxy for Internet-bound communications. The connector application 350 further allows the use of the cloud-based system 100 as a tunnel for Intranet-bound communications to the enterprise private resources. With the connector application 350 setting up a local network at the user device 300, the connector application 350 can manage communications between the Internet and the intranet, i.e., two of the main categories of cloud services—proxy to the Internet and tunnel to the intranet. The connector application 350 further has objectives of simplified user enrollment in the proxy and tunnels.

In an embodiment, the connector application 350 is a native application. The common functionality is abstracted out and made into common libraries based on C or C++ so that it can be reused across different platforms (e.g., iOS, Android, etc.). Example functionality: Traffic forwarding tunnels, local proxy, authentication backend, logging, statistics, etc. The UI components 710 and UI process components 712 can be platform dependent. Also, the connector application 350 is designed and implementable such that other third-party VPN applications, if configured by the enterprise, can be used concurrently.

The app portal 632 enables the installation of the connector application 350 on the user device 300. For example, an admin may be able to push and install the connector application 350 to the user device 300 using remote-push mechanisms like GPO, MDMs, etc. Additionally, the user can download the connector application 350 if they have access to the installation file and install it on their own. The connector application 350 supports automatic updates without impacting the user's Internet experience. If a problem is encountered, then it should roll back to the previously successful state or fail open. The connector application 350 can have a security check to ensure that it is not tampered and updated from the right source with a hash match with a source hash when upgrading.

The user can log into the connector application 350. Once the user sends their User ID through the connector application 350 to the agent manager cloud 606, the cloud-based system 100, and/or the app portal 632, the app portal 632 can determine the company's authentication mechanism, such as through a lookup in the enterprise asset management 614, and validate password through the enterprise CA 618.

Through the connector application 350, a user can be authenticated to the proxy or the VPN through the cloud-based system 100. For authentication of the user to the proxy, using SAML, the user can log into the connector application 350 by using their user ID and transparent SAML authentication thereafter, including SAML certificate. The app portal 632 shall determine that an organization is using SAML for authentication through the enterprise CA 618 and redirect to the enterprise SAML IDP 616 to get SAML assertion and use it to authenticate the user.

For authentication of the user to the tunnel, using SAML, the user can log into the connector application 350 by just using their user ID and based on the user ID, the connector application 350 shall redirect the user for authentication to enterprise SAML IDP 616 and SAML assertion shall be sent. The VPN service shall validate SAML assertion; if the assertion is valid, then the connector application 350 shall collect hardware parameters like device serial number, model number, etc. and create CSR. The CSR shall be signed by the enterprise CA 618, and the certificate shall be pushed to the connector application 350. The connector application 350 shall install the certificate to KMS/keychain and save assertion.

After the user has been successfully authenticated, the user shall be enrolled in the proxy service, and the user's traffic forwarding profile shall be downloaded from application 350, including Secure Sockets Layer (SSL) certificates and exceptions. The connector application 350 shall indicate that the user is connected to cloud-based system 100, and app statistics shall be populated.

After the user has successfully authenticated (including transparent authentication), the user shall be enrolled with a VPN service, and the VPN broker info shall be downloaded by the connector application 350, and the VPN tunnel shall be established. The connector application 350 can support captive portal detection to fail open when users are behind a captive portal to allow connection to a captive portal.

The connector application 350 can forward internal enterprise traffic from the user device 300 to the VPN. The connector application 350 can recognize when a user goes to an internal app that is provisioned with the VPN service. The connector application 350 shall auto-enable a tunnel to the VPN service when the user tries connecting to an internal app. The proxy service can always be enforced, and the user is not able to remove it by switching off the tunnel or removing the connector application 350. Without the proxy solution enforced, the user is not able to access the Internet and would be prompted to restart the web security service, via the connector application 350.

The VPN is an on-demand service, unlike the proxy service that shall be enforceable by default so that the user can enable/disable the VPN at will without any password requirements. Once the user logs into the VPN service using a 'Connect,' the same button shall be labeled 'Disconnect,' and the user shall be able to disconnect the VPN service with a single click. Every time user disconnects with VPN service. The VPN service can be auto-disabled if the user puts their system to sleep mode or there is inactivity (no packets exchanged) after x minutes (x shall be configurable in the VPN settings).

The admin can turn off the proxy service with a single client from an admin UI for a user, all users, or some subset of users. This does not remove the connector application 350 from the user device 300. A user may be able to disable the proxy service, provided they have the authority and credentials. The connector application 350 can provide service-related notifications to the user. For example, the connector application 350 can provide notifications such as push alerts or the like as well as contain a notification area for a single place to show all notifications that are generated by the proxy service and the VPN service. This shall also include app notifications, including configuration updates, agent updates, etc. The user shall be able to clear notifications as well as filter notifications from this screen. This shall include a filter for VPN/Proxy, blocked, cautioned, quarantine actions.

Connector Application—User Workflow

Again, the connector application 350 is executed on the user device 300. For authentication, the user enters a User ID in the connector application 350, such as userid@domain. Subsequently, the connector application 350 is configured to discover the services enabled—proxy service and VPN services based on userid@domain. The user authenticates with the presented services, i.e., proxy service, VPN services, and combinations thereof. The connector application 350 is auto-provisioned for the authenticated service by downloading the service-specific configuration. The connector application 350 performs the following during VPN enrollment—get the User/Device certificate signed by an Enterprise Intermediate Certificate. This Intermediate Certificate will be the same, which will be used for signing Assistants. The connector application 350 also will pin hardware signatures/fingerprints to the certificate and user, e.g., Storage Serial ID (Hard Drive Serial ID), CPU ID, Mother Board Serial ID, BIOS serial number, etc.

Connector Application—Authentication and Enrollment Protocol

Figure 12:
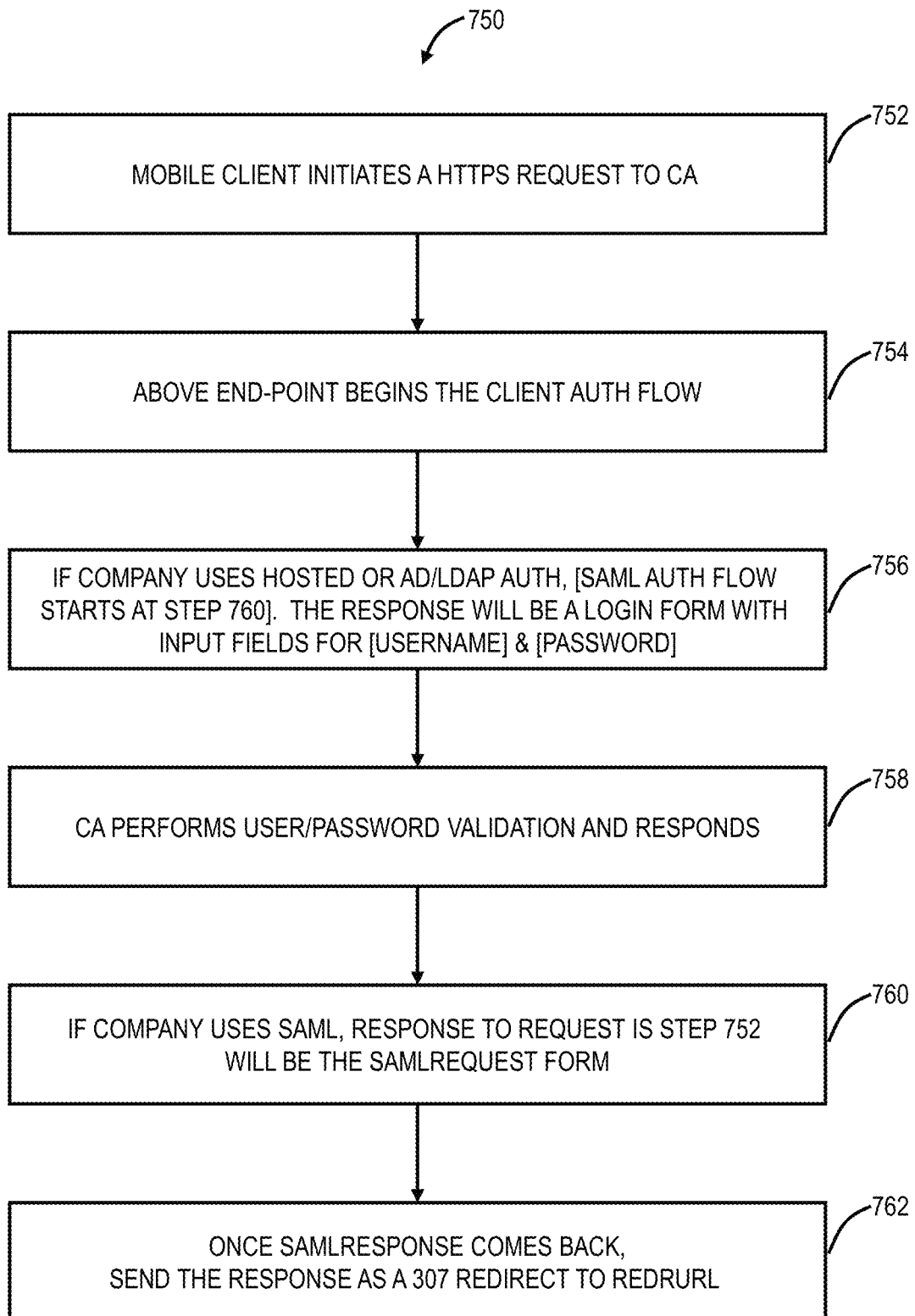
FIG. 12 is a flowchart of a VPN authentication process to the cloud-based system.

FIG. 12 is a flowchart of a proxy authentication process 750 to the cloud-based system 100. For authentication in the proxy service, conventionally, devices 300 can use proxy authentication to register to the cloud-based system 100. This is not truly reliable as it depends on location/location-authentication policy/VPN and other such factors to work correctly. To simplify this flow, the following new flow can be used with the connector application 350 for the process 750. First, the mobile client user device 300 initiates an HTTPS request to a CA (e.g., the enterprise CA 618) (step 752). For example, this can be as follows:
login.zscaler.net/
   clstart?version=1&_domain=nestle.com&redrurl=<url-encoded-url-with-schema>
If the domain is invalid or if the redrurl is missing, CA will reset the connection.

The above endpoint begins the client auth flow (step 754). The provided domain is the company that requires the auth. The CA looks up the domain to find the company and their auth mechanism. If the company uses hosted or Active Directory (AD)/Lightweight Directory Access Protocol (LDAP) authentication [SAML auth flow starts at step 760], the response will be a login form with input fields for [username] & [password] (step 756). The form is submitted via POST to the CA at a below endpoint:

https://login.zscaler.net/clicred. The HTTP content may look like below
POST /clicred
Host: login.zscaler.net
Content-Length: xyz
username=xyz@nestle.com&password=123456&redrurl=<url-encoded-posturl-with-schema>

Next, the CA performs user/password validation and responds with the message explained in step 762 (step 758). If the company uses SAML, the response to the request in step 752 will be the SAMLRequest form (step 760). The SAMLRequest form will auto-submit to the IDP. Once auth completes, the CA gets control back with the identity of the user. Once SAMLResponse comes back, send the response as a 307 redirect to redrurl with a below format (step 762)

Location: zsa://auth[?token=encrypted-cookie&...] to be appended.
307 query params
----------------
token= (on success)
ecode= (on error)
emsg= (on error)

On error, send the same redrurl with below format
zsa://auth?ecode=<code>&emsg=<message>

Figure 13:
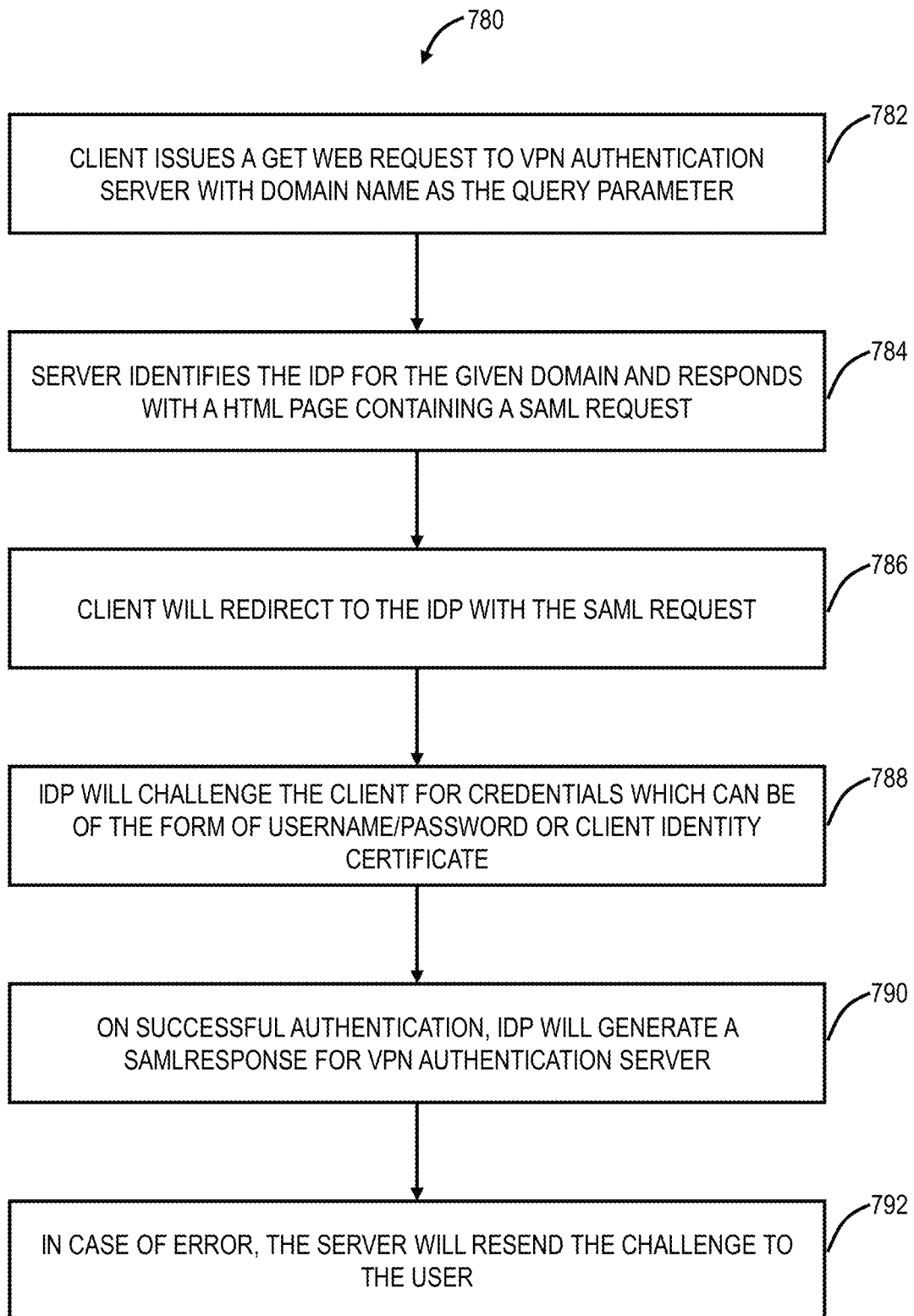
FIG. 13 is a flowchart of a device enrollment process for the client user device and the connector application.

FIG. 13 is a flowchart of a VPN authentication process 780 to the cloud-based system 100. The client (user device 300) issues a GET web request to the VPN authentication server with the domain name as the query parameter (step 782), such as:
GET //<auth-server>?domain=mockcompany.com
The server identifies the IDP for the given domain and responds with a Hypertext Markup Language (HTML) page containing a SAML Request (step 784). The client will redirect to the IDP with the SAML Request (step 786). The IDP will challenge the client for credentials, which can be of the form of a username/password or client identity certificate (step 788). On successful authentication, IDP will generate a SAMLResponse for the VPN authentication server (step 790). The client will record the SAMLAssertion for future tunnel negotiation. In the case of error, the server will resend the challenge to the user (step 792).

Figure 14:
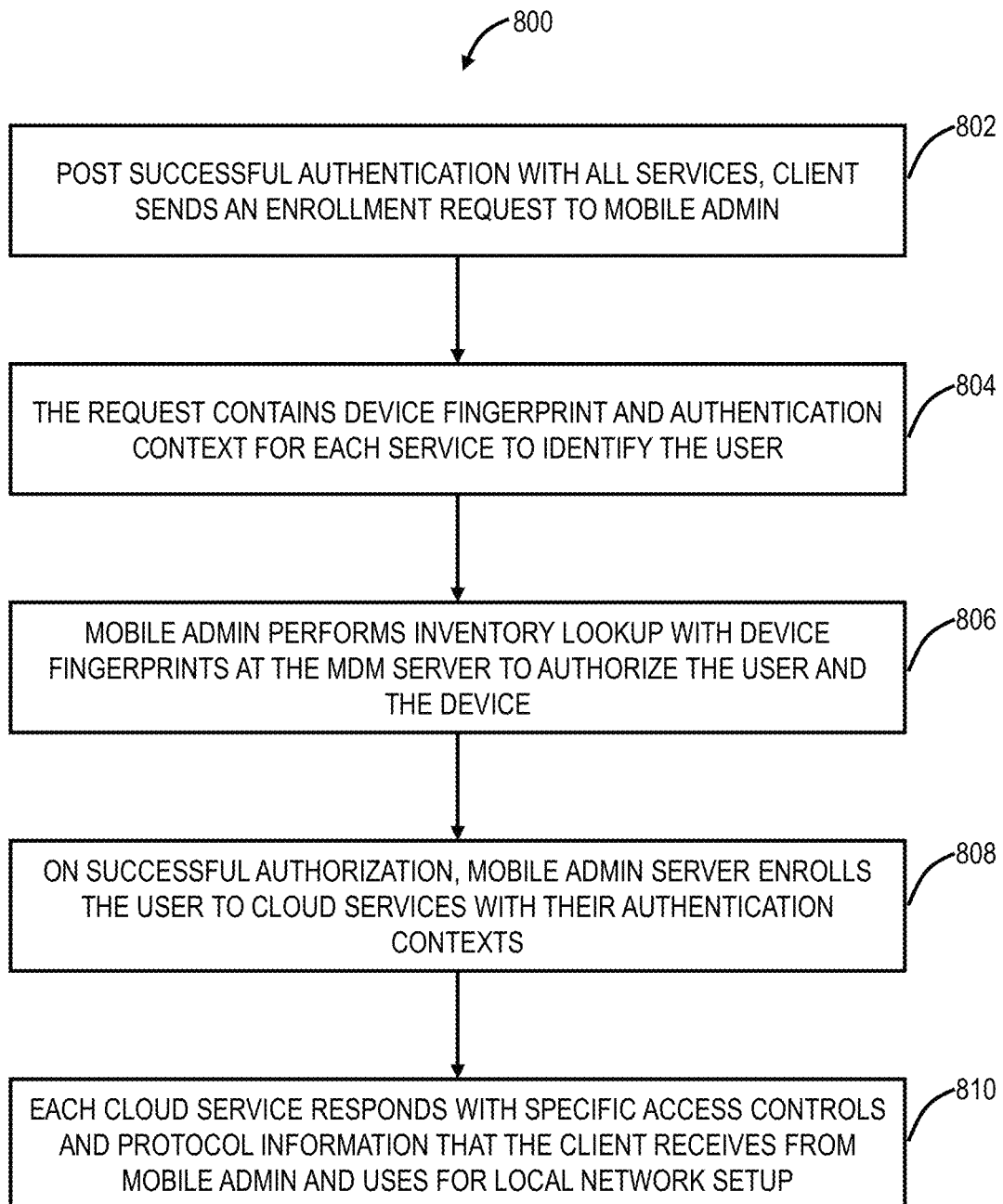
FIG. 14 is a flowchart of a traffic interception process implemented through the connector application.

FIG. 14 is a flowchart of a device enrollment process 800 for the client user device 300 and the connector application 350. Post successful authentication with all services, in this case, the proxy services, and the VPN services, the client sends an enrollment request to mobile admin (Cloud Administrative Server CAS) (step 802). The request contains a device fingerprint and an authentication context for each service to identify the user (step 804). For example, the cloud-based system 100 can use cookies, and the VPN can use SAMLAssertion for the authentication context. The mobile admin (agent manager cloud 606) performs inventory lookup with device fingerprints at the MDM server to authorize the user and the user device 300 (step 806). On successful authorization, the mobile admin server enrolls the user to cloud services with their authentication contexts (step 808). Each cloud service responds with specific access controls and protocol information that the client receives from mobile admin and uses for local network setup (step 810).

Connector Application—Traffic Interception and Splitting

Again, to protect Internet-bound traffic and simultaneously access enterprise-specific Intranet traffic, the user device 300 needs to connect through multiple applications. Again, it is not straightforward for users to configure these applications in different networks, and different VPN and proxy solutions arise compatibility issues when operating simultaneously. The connector application 350 is designed to solve all these issues. The connector application 350 handles both proxy (Internet-bound) traffic, and Enterprise Intranet bound traffic. The connector application 350 provides secure access to Organizational internal resources when the user is outside of the enterprise network. For Internet-bound traffic, it will forward traffic to the enforcement node 150, and for intranet bound traffic, it will forward traffic to a VPN (Broker) or direct if the user is inside the organization network.

The connector application 350 is configured to intercept all traffic, specifically to intercept all Transmission Control Protocol (TCP) traffic and DNS traffic before it goes out through the external network interface in the user device 300. The connector application 350 can intercept other types of traffic as well, such as the User Datagram Protocol (UDP). The connector application 350 is configured to split traffic at the user device 300, i.e., based on a local network configured at the user device 300. Split traffic based upon port, protocol, and destination IP. The connector application 350 is configured to send VPN traffic direct for trusted networks (organization's internal network). The connector application 350 can also coexist with other VPN clients, i.e., it does not intercept the traffic targeted for those interfaces by specific routes.

Figure 15:
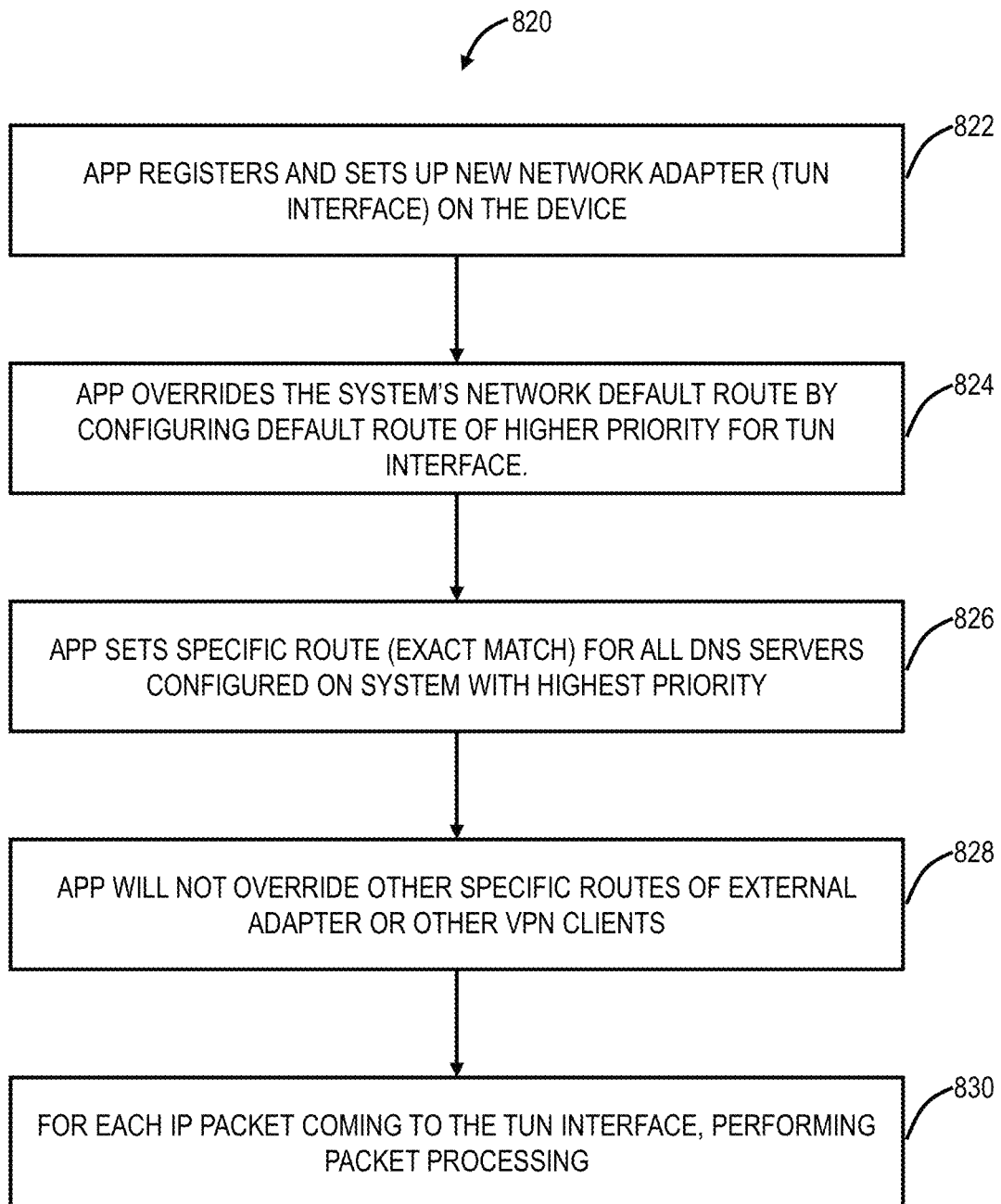
FIG. 15 is a flow diagram of traffic interception and splitting using the connector application.

Thus, the connector application 350 is configured to intercept all traffic at the IP layer for the device 300 or other VPN client's default route. Then, the connector application 350 is configured to split traffic. Based upon port, protocol, and destination IP as configured by the IT administrator FIG. 15 is a flowchart of a traffic interception process 820 implemented through the connector application 350. The connector application 350 registers and sets up a new Network Adapter (TUN interface) on the device (step 822). The connector application 350 overrides the device's network default route by configuring the default route of higher priority for the TUN interface (step 824). The connector application 350 sets a specific route (exact match) for all DNS servers configured on the user device 300 with the highest priority (step 826). The connector application 350 will not override other specific routes of an external adapter or other VPN clients (step 828).

For each IP packet coming to the TUN interface, packet processing is performed (step 830). The application does a <port, protocol, destination-IP> lookup on every IP packet and sends it on one of the dedicated tunnels based upon configured rules of packet transport.

Figure 16:
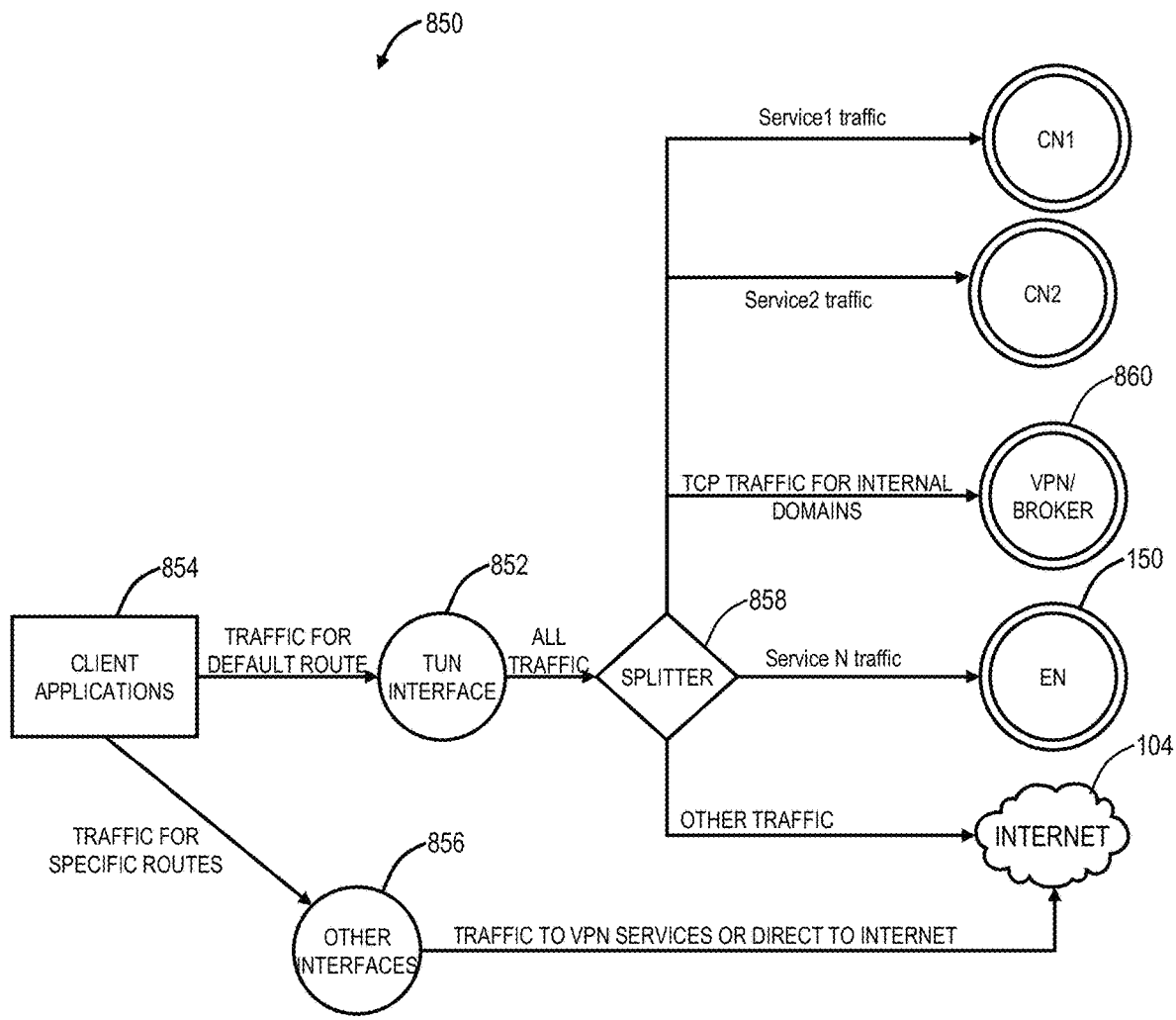
FIG. 16 is a flow diagram of tunnel forwarding rules by the connector application.

FIG. 16 is a flow diagram of traffic interception and splitting 850 using the connector application 350. Again, the connector application 350 creates and operates a tunnel (TUN) interface 852 on the user device 300. The user device 300 includes one or more client applications 854, which can be any program or service executable on the user device 300, which requires access to the network interface on the user device 300. Traffic for the default route from the client applications 854 is sent to the TUN interface 852, but traffic for specific routes can be sent to other interfaces 856, separate from the TUN interface, for direct connectivity to the Internet 104, such as via VPN services or direct.

The TUN interface 852 splits 858 all traffic. TCP traffic for internal domains is sent to a VPN/broker server 860, TCP port 80/443 traffic is sent to the cloud-based system 100 for a proxy such as to the enforcement node 150. Finally, other traffic can be sent directly to the Internet 104. In this manner, the TUN interface 852 operates a local network at the user device 300.

Figure 17:
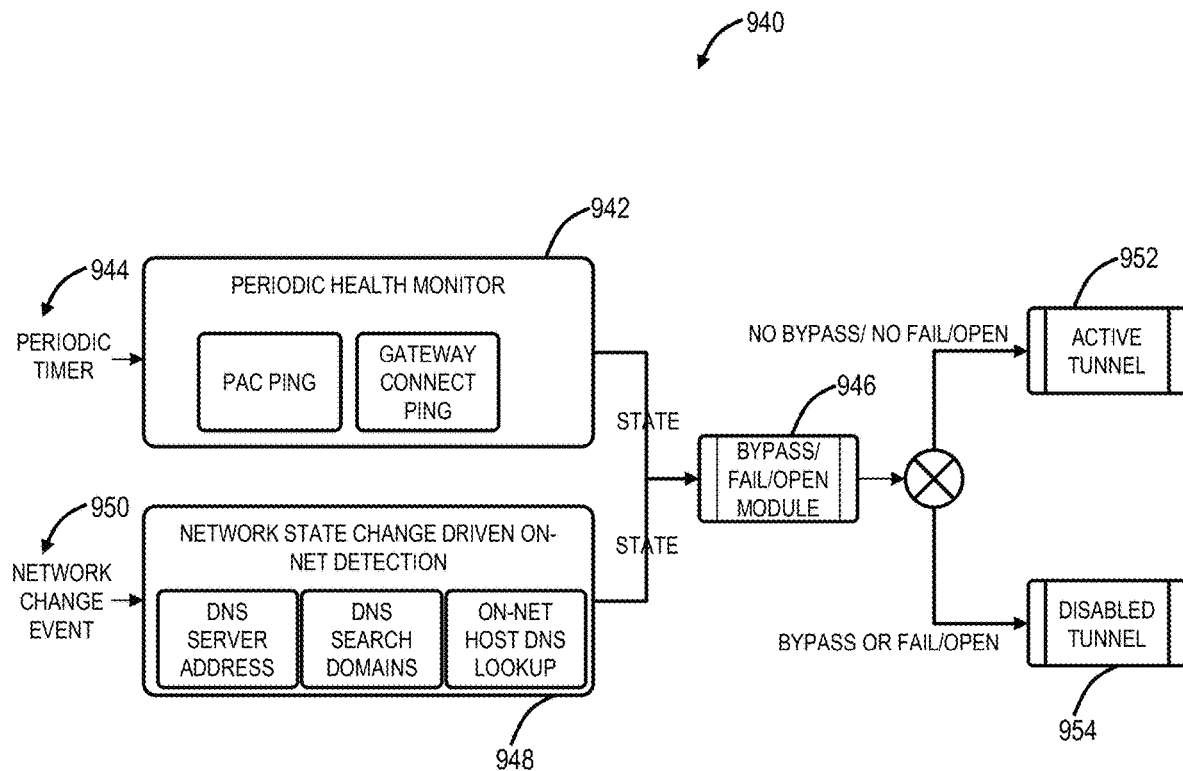
FIG. 17 is a flowchart of a service drive split tunneling process.

FIG. 17 is a flow diagram of tunnel forwarding rules 940 by the connector application 350. A periodic health monitor function 942 operates, based on a periodic timer 944, to check a PAC ping and a gateway connect ping to provide a state to a bypass fail/open module 946. A network state change function 948 is configured to detect a network change event 950 such as DNS server address, DNS search domains, on-net host DNS lookups, etc., and to provide a state to the bypass fail/open module 946. The bypass fail/open module 946 creates an active tunnel 952 or disabled tunnel 954 based on the states.

Service Driven Split Tunneling

Figure 18:
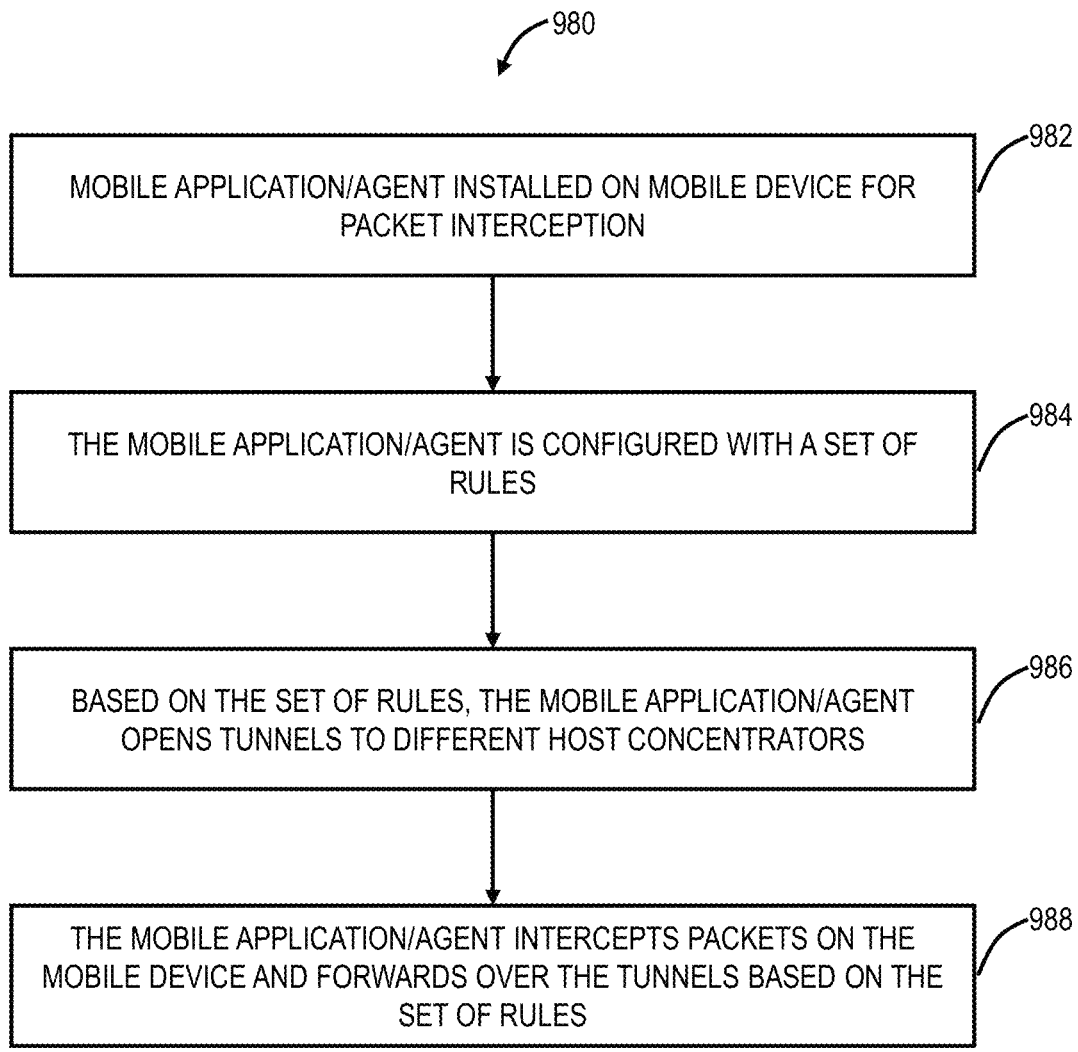
FIG. 18 is a network diagram of a network illustrating the user device with the connector application automatically detecting a location or network type and instantiating the proper traffic forwarding behavior based thereon.

FIG. 18 is a flowchart of a service drive split tunneling process 980. The service drive split tunneling process 980 provides better scalability, security, and segmentation of traffic in mobile and cloud environments. The service-driven split tunneling process 980 can include the traffic interception and splitting 850 using the connector application 350. Again, as illustrated in FIG. 18, the connector application 350 creates and operates a tunnel (TUN) interface 852 on the mobile user device 300. The mobile user device 300 includes one or more client applications 854, which can be any program or service executable on the user device 300, which requires access to the network interface on the user device 300. Traffic for the default route from the client applications 854 is sent to the TUN interface 852, but traffic for specific routes can be sent to other interfaces 856, separate from the TUN interface, for direct connectivity to the Internet 104, such as via VPN services or direct.

The service drive split tunneling process 980 includes a mobile application/agent which is installed on a mobile device for packet interception (step 982). For example, the mobile application/agent can be the connector application 350 on the mobile user device 300. The mobile application/agent can inject a default route on the mobile device pointing to its own interface to get all Layer 2 or Layer 3 packets.

The mobile application/agent is configured with a set of rules (step 984). The set of rules can be learned at runtime (as the mobile application/agent operates, configured at application launch, configured during application operation, and a combination thereof. For example, the set of rules can be configured by IT administrators for specific users, groups, departments, etc. and sent to the mobile application/agent. Further, the set of rules can be learned based on the operation of the mobile application/agent.

The set of rules can be an array of tuples of included and excluded traffic. For example, the array of tuples can include the following format <exclude, destination_port, protocol, destination_IP address_subnet>

<include, destination_port, protocol, destination_IP address_subnet, transport_type>

For example, a set of rules can include

<include, 443, TCP, 17.0.0.0/8, <TCP, gateway.zscaler.net:80

This rule would tunnel all TCP port 443 traffic destined to 17.0.0.0/8 subnet over a TCP transport on port 80 to host. com. Another rule can include <exclude, 53, UDP, *>

This rule does not tunnel any UDP port 53 (DNS) traffic, but rather sends it direct.

Based on the set of rules, the mobile application/agent opens tunnels to different host concentrators (step 986). As described herein, the host concentrators can be the enforcement nodes 150, etc. The tunnel may or may not be authenticated depending upon the requirements. For the traffic that needs to go direct, the mobile application/agent proxies the connections locally through a RAW Socket or via a custom TCP/IP Stack embedded within the application itself The mobile application/agent intercepts packets on the user device and forwards over the tunnels based on the set of rules (step 988). Through this granular splitting of network traffic, IT administrators will have better control of the network traffic in terms of security and scalability. For instance, an IT admin can now control that only special traffic such as Session Initiation Protocol (SIP) should go outside the tunnel, and rest should go to some security gateway or vice versa. Any number of complex rules is hence possible.

End users will also have significant performance benefits over traditional SSL/IPSec VPNs where traffic of different needs compete with each other. The service drive split tunneling process 980 allows function-driven security and on-demand scalability for different services. So, File Transfer Protocol (FTP) traffic goes to a secure FTP proxy, Web traffic (TCP, port 80 traffic) goes to a Web proxy, HTTPS (TCP, port 443) goes to an SSL acceleration proxy, SIP traffic goes to SIP traffic processing concentrator and so on.

Traffic Forwarding Based on Location or Network Trust

The connector application 350 can always operate on the user device 300 and used for traffic forwarding. Specifically, the connector application 350 can be used to access different cloud services when the user device 300 is on different networks. The cloud services can be via the cloud-based system 100, etc. Specifically, the connector application 350 can automatically select a forwarding profile to a specific cloud service based on a location of the user device 300. The forwarding profile defines how the connector application 350 treats traffic with the user device 300 in different network environments. The network environments can include a trusted network and an untrusted network. There can be other network environments, such as on the trusted network via a VPN.

On a trusted network, the user device 300 is connected to a private network that is known to be trusted, e.g., belongs to an organization, such as the enterprise network 420. A VPN trusted network can be when the user device 300 is connected to the trusted network above via a VPN in full-tunnel mode. The VPN must be configured to capture all, and not just some, of the user's traffic to the trusted network by installing a default route in the routing table of the client device. Off the trusted network is when the user device 300 is connected to an untrusted network, e.g., a home network, a public network, etc.

Figure 19:
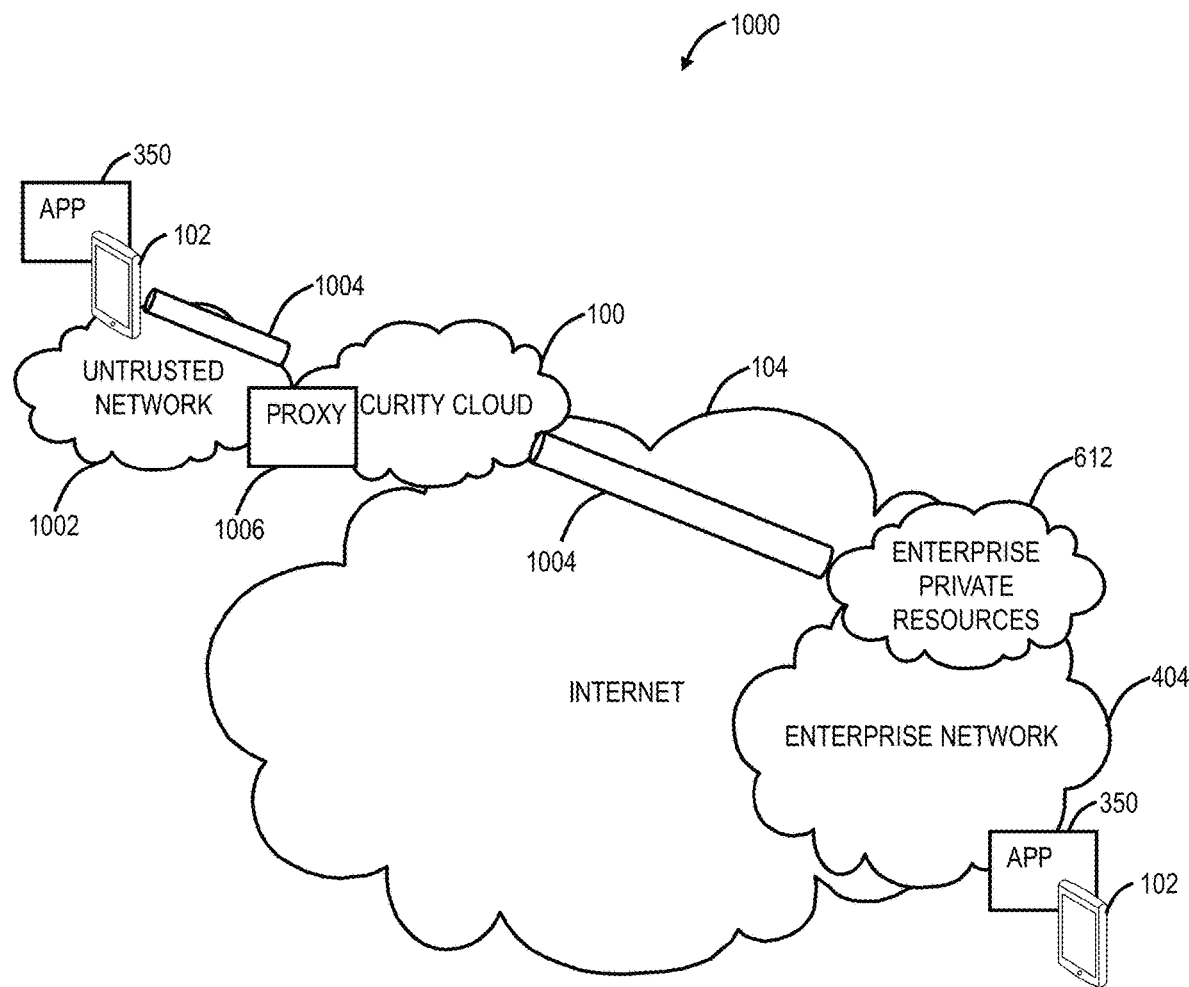
FIG. 19 is a flowchart of a process for the use of DHCP for location information of a user device for automatic traffic forwarding.

FIG. 19 is a network diagram of a network 1000 illustrating the user device 300 with the application 350 automatically detecting a location or network type and instantiating the proper traffic forwarding behavior based thereon. In this example, the network 1000 includes an untrusted network 1002, the cloud-based system 100, the Internet 104, and the enterprise network 420, which includes private resources 612.

The user device 300 moves between the networks 1002, etc., and the connector application 350 allows seamless access to cloud services, such as offered via the cloud-based system 100, or the private resources 612, inside the enterprise network. The untrusted network 1002 can be a home network (e.g., Wi-Fi, cable modem, etc.), a public network, etc. It is untrusted in the sense that an IT administrator associated with the enterprise network 420 does not have control of the network. The enterprise network 420 is a trusted network, i.e., the IT administrator has control over this network. On the trusted network, data can be communicated transparently without concern for data leakage or corruption as the trusted network has security, such as via firewalls and other perimeter defenses.

When a user connects to a network, either the untrusted network 1002, the enterprise network 420, the Internet 104, etc., the connector application 350 checks to determine what type of network the user device 300 is connected to for selecting a proper forwarding profile. For example, on the untrusted network 1002, the connector application 350 can automatically install a tunnel 1004 to the cloud-based system 100, to the private resources 612, etc., or the connector application 350 can cause Internet traffic to access the Internet 104 via a proxy 1006, such as the enforcement node 150. On the other hand, when the user device 300 is on the enterprise network 420, the connector application 350 can cause traffic forwarding direct, to the private resources 612, to the Internet 104, etc.

There can be multiple forwarding profiles. For example, if there are multiple locations with different network information, one can configure different forwarding profiles so that the connector application 350 can recognize the right network for different users and know how to respond upon detecting those networks.

Figure 20:
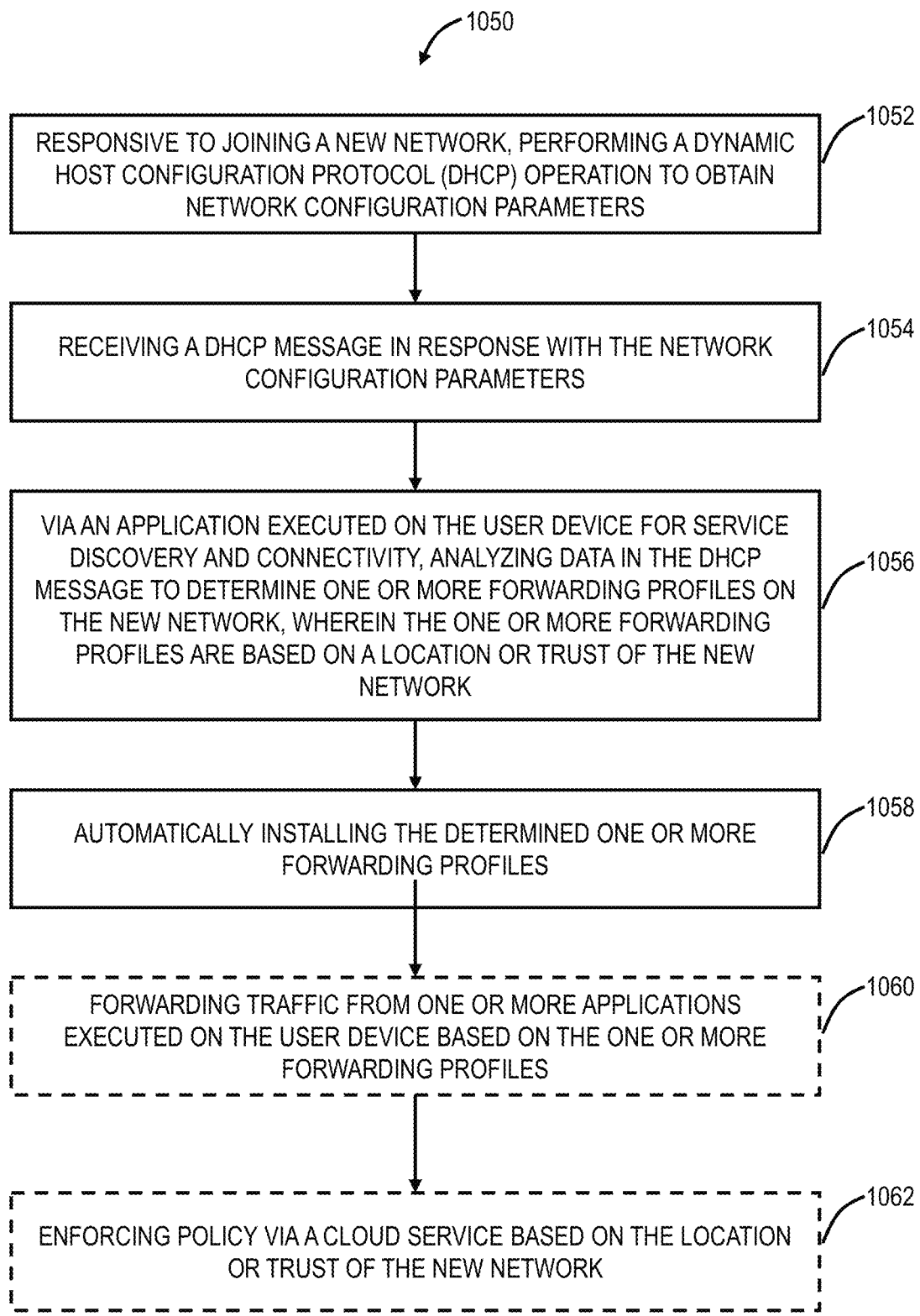
FIG. 20 is screenshots of UI screens for selecting/defining trusted networks.

FIG. 20 is a flowchart of a process 1050 for the use of DHCP for location information of a user device for automatic traffic forwarding, via the connector application 350. The process 1050 can be implemented as a method, as a non-transitory computer-readable medium storing computer-executable instructions that, when executed, cause a processor of the user device 300 to perform the steps, and/or via the user device 300.

The process 1050 includes, responsive to joining a new network, performing a Dynamic Host Configuration Protocol (DHCP) operation to obtain network configuration parameters (step 1052); receiving a DHCP message in response with the network configuration parameters (step 1054); via an application 350 executed on the user device for service discovery and connectivity, analyzing data in the DHCP message to determine one or more forwarding profiles on the new network, wherein the one or more forwarding profiles are based on a location or trust of the new network (step 1056); and automatically installing the determined one or more forwarding profiles (step 1058).

The process 1050 can also include forwarding traffic from one or more applications executed on the user device based on the one or more forwarding profiles (step 1060). The process 1050 can also include enforcing policy via a cloud service based on the location or trust of the new network (step 1062). The one or more forwarding profiles can include one of a tunnel, a connection to a proxy, and direct forwarding.

The data to determine the location or trust of the new network is in the DHCP message received from a DHCP server. As known in the art, the DHCP server provides conventional information such as an IP address, lease information, etc. The DHCP server can also provide a DNS server for domain name queries. It is difficult to use the IP address or DNS server as an indication of the location or trust. For example, the DNS servers may be the same across different locations, the IP addresses may overlap, etc. That is, conventional information in the DHCP messages from the DHCP server is inadequate to make an appropriate judgment of the location or trust of the new network.

In an embodiment, the process 1050 includes data in the DHCP message is located in DHCP options. DHCP options are a section which can include various information, including vendor-specific information. For example, a predetermined value can be included in the DHCP options where the predetermined value is indicative of a trusted network, and the absence of the predetermined value is indicative of an untrusted network. Here, the DHCP server on a trusted network is appropriately configured with the predetermined value, as are the user device 300 in its application 350. The predetermined value can be any key-value pair that is evaluated via the application for a TRUE/FALSE.

The one or more forwarding profiles can include secure forwarding on the untrusted network and unsecure forwarding on the trusted network. Secure forwarding can include tunnels, VPNs, proxy connections via a secure cloud, etc.

In another embodiment, the data further includes a second predetermined value indicative of another trusted network, and the one or more forwarding profiles can include secure forwarding on the another trusted network, while there is unsecure tunnel on the trusted network. This, for example, can be used when a user from one office visits another office, or in various other use cases.

In a further embodiment, the location or trust of the new network can be used to determine policy, e.g., access gambling.com from an untrusted network but not from a trusted network. The location or trust can be used to determine DLP rules, sandboxing, etc.

Cloud Policies Based on Network Trust

The previous discussion herein included a trusted network and an untrusted network. The present disclosure includes this as well as multiple different trusted networks. That is, there can be an untrusted network and multiple trusted networks. Examples of an untrusted network can include a home network, public Wi-Fi hotspots, cellular networks, the Internet in general, etc. Examples of trusted networks can be the headquarters 112 and the branch office 118, e.g., these could have different levels or network trust rules. Various other examples are contemplated.

As discussed herein, forwarding profiles define traffic forwarding between the user devices 300, the cloud-based system 100, the Internet 104, the cloud applications 106, the applications 402, 404, etc. The present disclosure includes the ability to have trusted networks separate from forwarding profiles in order to reuse them for forwarding profiles by just association instead of repetitive addition. In addition, this would give a many-to-many mapping of the trusted networks to forwarding profiles that works well for the geographically separated locations of an organization that would have multiple trusted networks. That is, the forwarding profile can be separate from the network trust rules.

With reference to the cloud-based system 100 in FIGS. 1 and 2, there are various user devices 300 associated with users 102, with the users 102 including the devices 110, 116, or being located at the locations 112, 114, 118, or at other locations. The forwarding profile defines how traffic is forward between the user device 300, the cloud-based system 100, and other networks (the Internet 104, the cloud applications 106, the applications 402, 406, etc.). In addition, networks are now given a trust levels, either one of a plurality of trust levels, and an untrusted level. There are network trust rules for each of the trust levels, and the network trust rules determine policies used by the cloud-based system 100, e.g., security, URL content filtering, DLP, CASB, etc. related policies.

Figure 21:
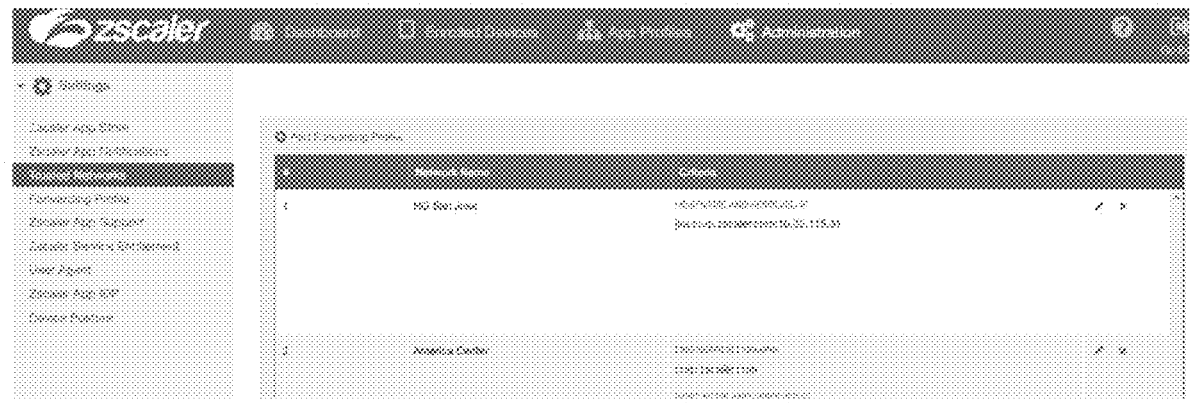
FIG. 21 is a flowchart of a process for cloud policy enforcement based on network trust.

An administrator can interact with the management system 120 to define network trust. FIG. 21 is screenshots of UI screens for selecting/defining trusted networks. The management system 120 includes a database that can include a trusted networks table that can identify a network (such as by network name, location, DNS servers, company ID, etc.) as well as a trust level. The network can be identified by trusted network criteria including a DNS server, DNS search domains, hostname and IP, and pre-defined trusted networks for selection. Specifically, the network location can be detected by criteria—DNS server, DNS search domains, hostname and IP, etc. In FIG. 21, an example network HQ San Jose is identified by a hostname and resolved IP, and a second example network America Center is identified by a DNS search domain.

Evaluation of the network can be performed by the connector application 350 on the user device 300. The connection application can fetch of the DNS server list and search domains to compare with the trusted networks table, to figure out whether the network is one of the trusted networks or an untrusted network. The trusted networks table can be in the cloud-based system 100, and the evaluation can be based on communication between the user device 300 and a corresponding enforcement node 150. A wireless network, e.g., Wi-Fi Network, can be identified based on a Service Set Identifier (SSID).

There can be an association between each network in the trusted networks table and the forwarding profiles. The connection application 350 is also configured to use the forwarding profiles to access the cloud-based system 100, and the cloud-based system 100 is configured to use the network trust rules to determine the applied policies.

Figure 22:
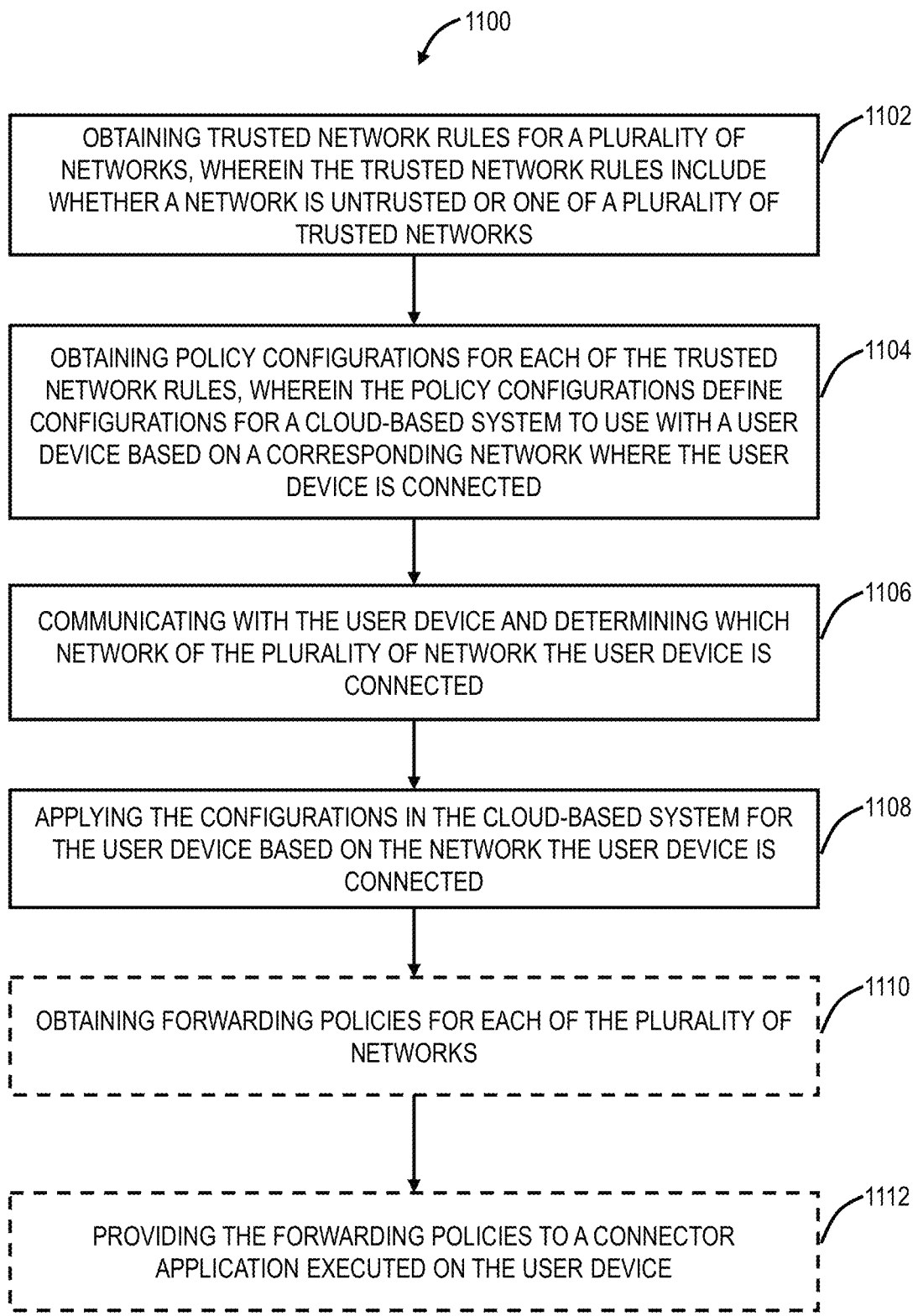
FIG. 22 is a flowchart of a process for cloud policy enforcement based on network trust.

FIG. 22 is a flowchart of a process 1100 for cloud policy enforcement based on network trust. The process 1100 can be implemented as a method, as a non-transitory computer-readable medium storing computer-executable instructions that, when executed, cause a processor to perform the steps, via the user device 300, and/or via the cloud-based system 100.

The steps in the process 1100 include obtaining trusted network rules for a plurality of networks, wherein the trusted network rules include whether a network is untrusted or one of a plurality of trusted networks (step 1102); obtaining policy configurations for each of the trusted network rules, wherein the policy configurations define configurations for a cloud-based system to use with a user device based on a corresponding network where the user device is connected (step 1104); communicating with the user device and determining which network of the plurality of network the user device is connected (step 1106); and applying the configurations in the cloud-based system for the user device based on the network the user device is connected (step 1108).

The steps in the process 1100 can also include obtaining forwarding policies for each of the plurality of networks (step 1110); and providing the forwarding policies to a connector application executed on the user device (step 1112). The policy configurations for each of the trusted network rules define the configurations in the cloud-based system and the forwarding policies for each of the plurality of networks define how traffic is forwarded by the user device to the cloud-based system. A same forwarding policy can be used for at least two of the plurality of networks.

The determining can be performed by the user device through detecting the network via any of a Domain Name Server (DNS) configuration, DNS search domains, and hostname and Internet Protocol (IP) address. The configurations can 4=include content filtering through the cloud-based system. The configurations can include Data Loss Prevention (DLP) monitoring through the cloud-based system. The configurations can include Cloud Access Security Broker (CASB) monitoring through the cloud-based system.

Client Forwarding Policies

In FIG. 6, and as described herein, a client forwarding policy includes rules that define how and when applications requests are forwarded in the ZTNA application, such as between the users 102 with a user device 300, the cloud-based system 100, the connectors 400, and the applications 402, 404. As described herein, a client forwarding policy defines rules related to what is stored on the user device 300 and rules when application requests (between the user device 300 and the applications 402, 404) are forwarded from the application 350 to the corresponding connectors 400 via the cloud-based system 100. That is, the client forwarding policy defines whether a particular user 102 accesses any of the applications 402, 404 directly or via zero trust access through the cloud-based system 100. The client forwarding policies are configurations in the cloud-based system 100.

Figure 23:
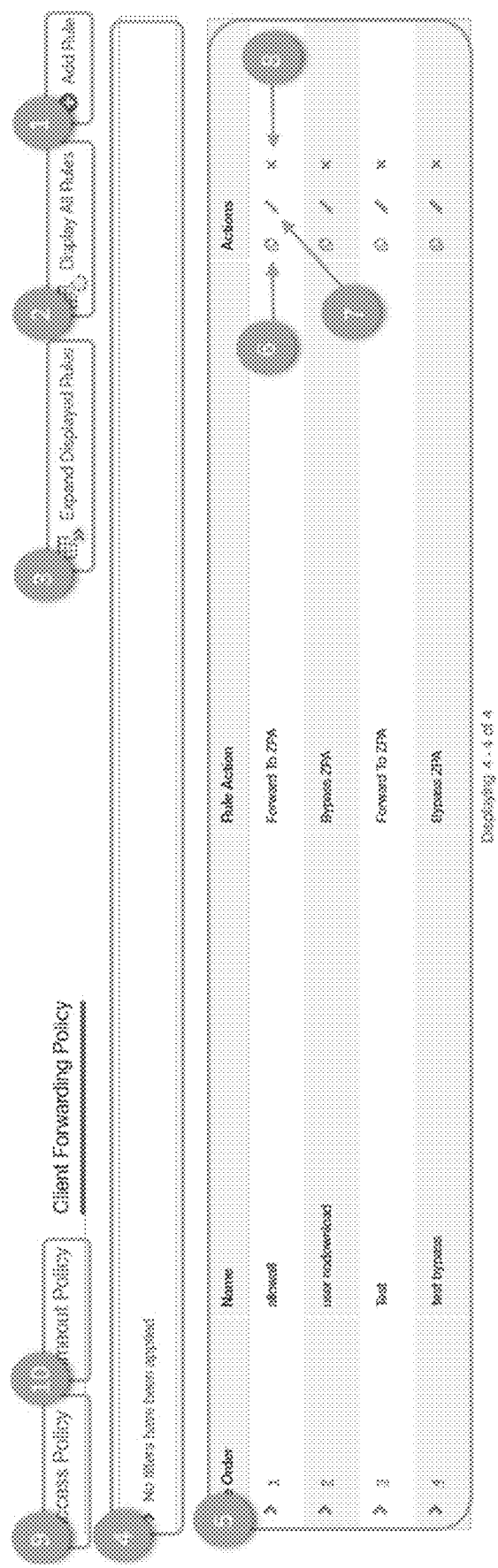
FIG. 23 is a screenshot of a client forwarding policy UI.

FIG. 23 is a screenshot of a client forwarding policy UI. Specifically, FIG. 23 illustrates the UI and associated steps for adding a new client forwarding policy in ZPA which is an example of zero trust access. First, an add rule button is selected to add a new client forwarding policy rule. Second, a display all rules button is selected to show client forwarding policy rules in a table. Third, an expand displayed rules button is select to expand all of the displayed rows in the table to see more information about each policy rule. Fourth, it is possible to filter the information that appears in the table. Fifth, the table includes a list of all client forwarding policy rules that were configured. For each rule, the following is displayed:

Rule Order: The policy evaluation order number for the rule. Zero trust access (ZPA) applies policy rules based on the order they are listed here. The rule order may be changed by clicking on the number and manually entering in a new value.

Name: The name of the rule. When the row is expanded, the description is also displayed here, if available.

Rule Action: Indicates if the rule will Bypass zero trust access (ZPA), Only Forward Allowed Applications, or Forward to Zero trust access (ZPA). When the row is expanded, it provides a visual representation of the Criteria (e.g., SAML attributes, application segments, trusted networks, etc.) and Boolean logic used within the rule.

Sixth, there is a button to copy an existing client forwarding policy rule's criteria, and use it to create a new rule. Seventh, there is a button to edit an existing client forwarding policy rule. Eighth, there is a button to delete a client forwarding policy rule. Ninth, there is a button to go to the Access Policy page, to add a new access policy or manage existing policies. Tenth, there is a button to go to the Timeout Policy page, to add a new timeout policy or manage existing policies.

Figure 24:
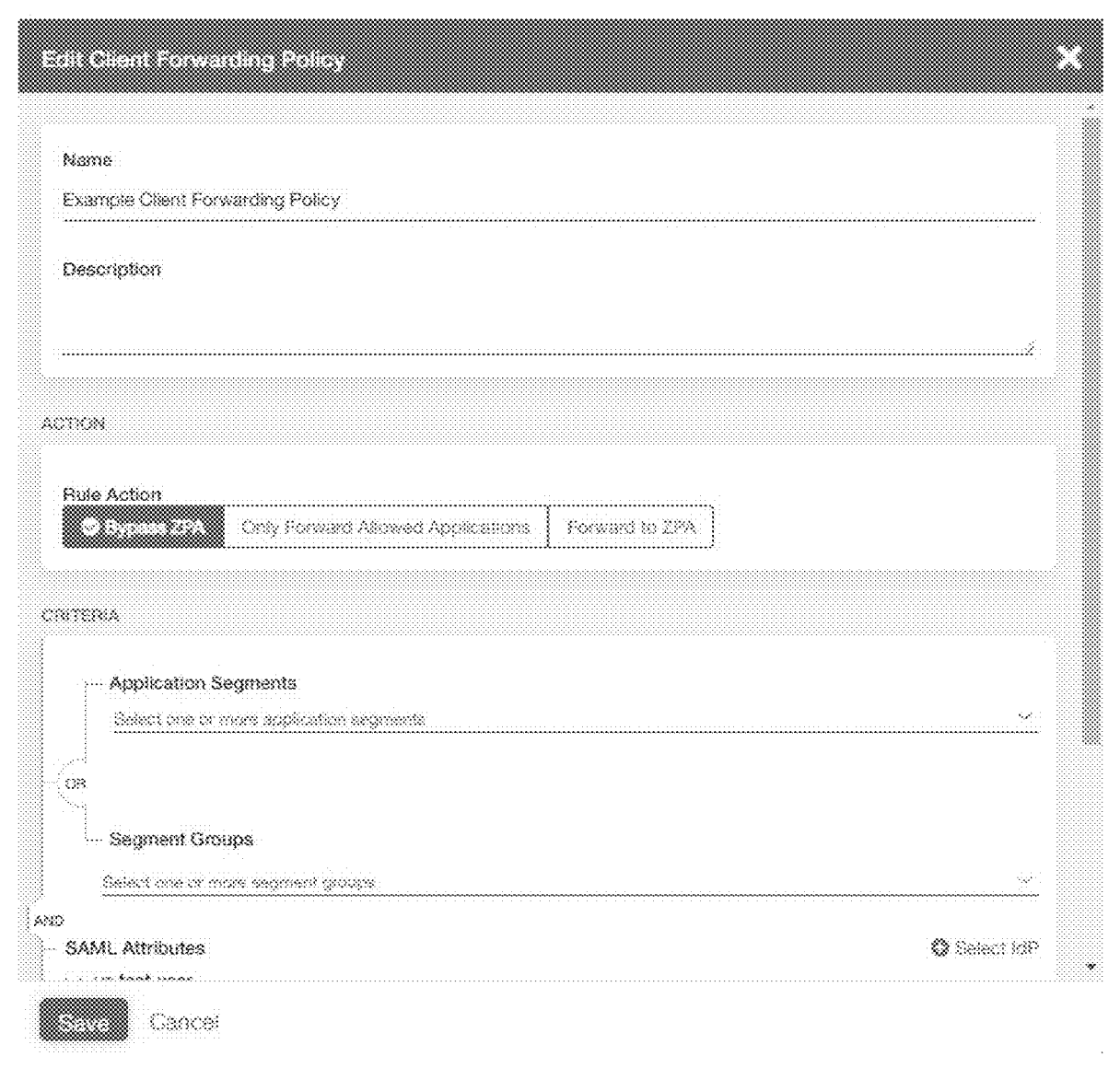

Thus, there can be multiple client forwarding policies that are applied in the rule order. Each client forwarding policy includes a rule (bypass zero trust access, forward only allowed applications to zero trust access, and forward all application requests to zero trust access) and criteria (application segments or segment groups), trusted networks, and SAML attributes. FIG. 24 is a screenshot of editing a particular client forwarding policy. Generally, the client forwarding policies are used to determine the access type (i.e., the rule—bypass zero trust access, forward only allowed applications to zero trust access, and forward all application requests to zero trust access) based on the criteria. That is, the rule is applied based on the criteria.

An application 402, 404 can include a fully qualified domain name (FQDN), local domain name, or IP address, which you define on a standard set of ports. Applications 402, 404 must be defined within an application segment which is a grouping of defined applications, based upon access type or user privileges. Zero trust access features such as double encryption, health reporting, etc. are configured per application segment. A segment group is a grouping of application segments allowing for configuration of user access policies based on segment groups. For example, if there is a set of defined applications for users only from the "Sales" department to access, a segment group called "Sales Applications" can be created and apply to it all sales-related applications. It is then possible to create an access policy using that segment group.

The client forwarding policy allows an admin to control which application segment definitions get downloaded to the user device 300, and how the user device 300 behaves.

Again, there are three actions that can be applied to an application segment, namely bypass zero trust access, forward only allowed applications to zero trust access, and forward all application requests to zero trust access. Bypass zero trust access allows an application segment to be downloaded to the user device 300. The user device 300 will bypass the cloud-based system 100 entirely for the application 402, 404. For example, for an application segment of www.acme.net:80, the DNS will resolve this, and the application 350 on the user device 300 will implicitly bypass the DNS to the local DNS server, which will resolve against Internet DNS.

For forward all application requests to zero trust access, this allows the application segment to be downloaded to the user device 300. The user device 300 will forward the application to the cloud-based system 100, where policy will be applied. For the application segment of www.acme.net:80, the user will DNS resolve this, the application 350 will intercept the DNS request and resolve it to an address in the cloud-based system 100. The user device 300 would connect to IP address on port 80 and traffic is forwarded to the cloud-based system 100 for policy to be applied.

The forward only allowed applications to zero trust access is where only allowed application segments are downloaded to the user device 300 for interception. This is an access policy that is evaluated for the application segments. For an application segment of www.acme.net:80, user mary@acme.net is denied access in the access policy, and user bob@acme.net is allowed access in the access policy. When user mary@acme.net requests the application 402, 404 in the application segment, they will not have a definition for the application, so the user device 300 would attempt to "go direct." When user bob@acme.net requests the application, the application 350 will intercept the DNS request and resolve it to an address in the cloud-based system 100. The user device 300 for user bob@acme.net would connect to the IP address on port 80 and traffic is forwarded to the cloud-based system 100 for zero trust access policy to be applied.

However, there are important considerations to this "Only Forward Allowed Applications" to plan in the application segment policy. In the above example user mary@acme.net is denied access to the application, so it does not download the application segment. However, if there is a wildcard application segment (*.acme.net) which is defined for the user to download—when the user attempts to access www.acme.net:80, this would "match" against the *.acme.net wildcard discovery application segment. The traffic would then be intercepted and forwarded to the cloud-based system 100, where policy would apply and deny access to the application. If the expectation is for this application to "bypass," then this would not be the outcome.

DNS SRV records—similar to above, however, DNS SRV records return pointers to services (e.g. _ldap._tcp.acme.net returns a pointer to domain-controller.acme.net:389). DNS would still match the wildcard discovery and return the answer to the user, in some cases (e.g., MS Teams/Skype uses _sip._tls.acme.net.) you might explicitly want this to bypass and resolve to the internet.

Client Forwarding Policy Use Cases

In a first use case, there is a requirement that some zero trust applications should be tunneled (tunnel as described herein means forwarded through the cloud-based system 100 for zero trust access) when on the trusted network, but NOT tunneled when off. This is somewhat the opposite of the typical zero trust access policy, i.e., tunnel when on an untrusted network and no tunnel when on a trusted network. However, the majority of the zero trust applications still need to be tunneled when off a trusted network. Conventionally, this poses a problem, because the administrator needs to choose a binary ON/OFF trusted network. The client forwarding policy enables the ability to define a rule that includes some of the zero trust applications to tunnel while on a trusted network and not to tunnel while on an untrusted network.

In a second use case, a tenant has a full zero trust model. They want users to go through the cloud-based system 100 always when on or off trusted networks. However, they have one small management network segment that should only be accessed when the user is on-premises, i.e., on a specific trusted network. This poses a problem because the cloud-based system 100 is enabled for on and off trusted networks, meaning that management segment is always available. The client forwarding policy enables the ability to set the access policy for this small management network segment that includes zero trust access when on a specific trusted network and no access otherwise.

In a third use case, a tenant has employees that work as contractors for multiple other companies. They need to be able to tunnel in some of these, but not all of these. Today they need to define all of these other company sites as trusted networks or off trusted networks, which means hundreds of trusted network criteria matches are needed. The administrator could gradually fingerprint all of the other company networks and then define policies for tunneling or not tunneling for each of these.

In a fourth use case, a tenant performs a lot of Merger & Acquisition (M&A) activities and sometimes these involved companies that are already customers of the cloud-based system 100. This means that Company A has applications A, B, C, and Company B has applications X, Y, Z. They need for Company A users to tunnel to applications X, Y, Z when they are at Company A's network, but not tunnel when they are at Company B's network (where the applications exist), and the reverse of this is needed too. Using the client forwarding policy, Company A can define Company B's network as a trusted network, and then instruct the rule to tunnel or not tunnel.

In a fifth use case, an airline has specific hidden wireless networks for their pilots and flight crew. The network configuration changes frequently, so it is not easy to flag these as trusted networks using the current criteria. Administrators want to be able to define these specific wireless networks as trusted networks, so that when the pilots are in the air, they can configure the application 350 to tunnel or bypass that traffic.

In a sixth use case, a tenant has some user groups that they want to limit the visibility of applications to. Although when all of the applications are downloaded to devices today and users are limited by access due to access policy, the visibility of these applications is the concern. For this particular group of users, the application 350 should only download the applications that the administrator defines. A scenario where this would be useful is the contractor scenario, where they hire an external contractor to come and work on a particular server. There is no need to expose ALL of the applications to this contractor, in fact its desired that their application 350 is only aware of certain apps. While this behavior is important, the current logic (sending all apps) is desired also for troubleshooting. Customers want the flexibility to choose whether all apps are sent or just a select list.

Client Forwarding Policy Process

Figure 25:
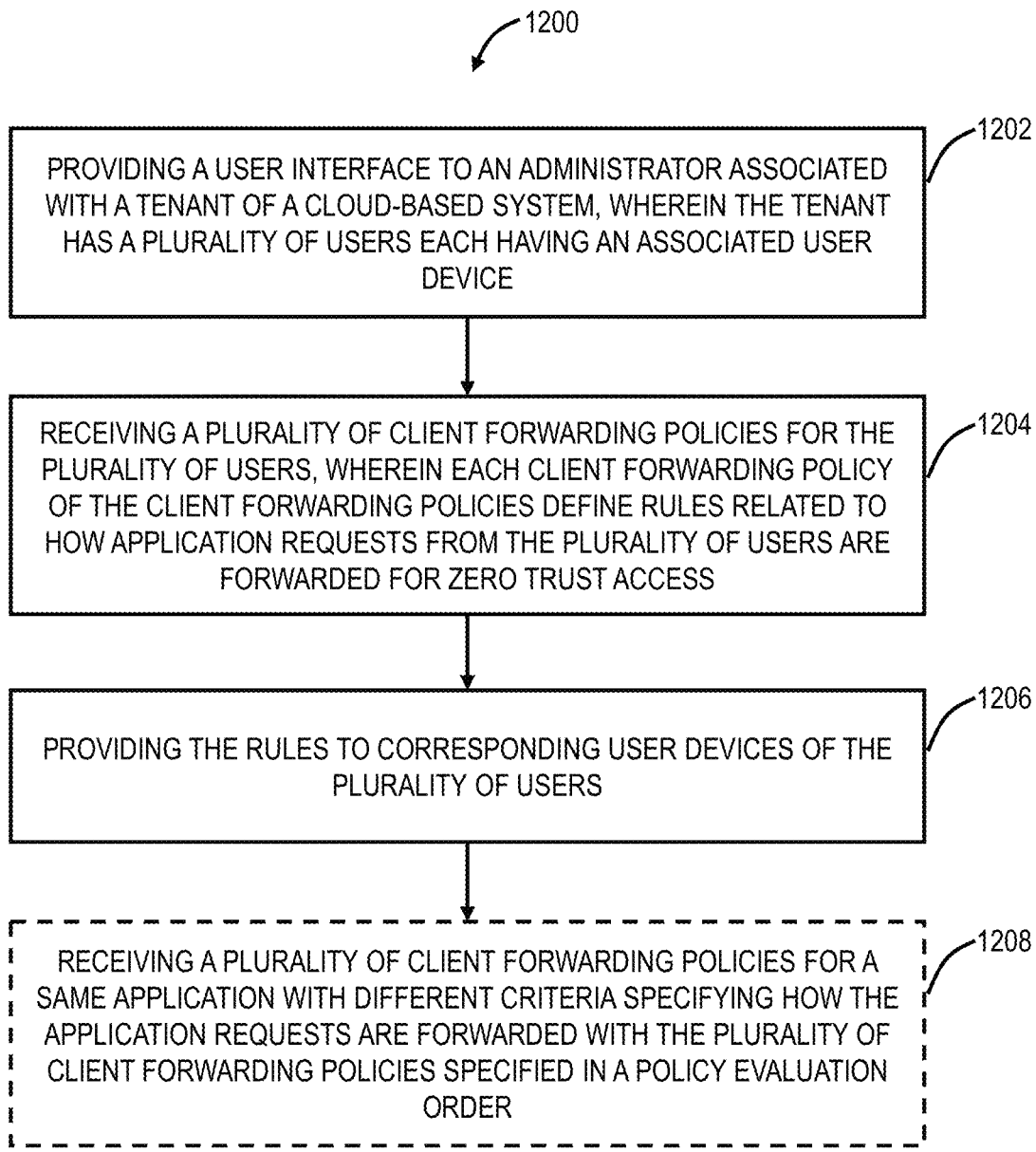
FIG. 25 is a flowchart of a client forwarding policy process.

FIG. 25 is a flowchart of a client forwarding policy process 1200. The client forwarding policy process 1200 can be implemented as a method, as a non-transitory computer-readable medium storing computer-executable instructions that, when executed, cause a processor to perform the steps, and/or via the cloud-based system 100. Specifically, the client forwarding policy process 1200 can be implemented by an IT administrator connected to the management system 120. The client forwarding policy process 1200 defines client forwarding policies that are in turn used to determine what is distributed to the users 102 and their user devices 300 for accessing the applications 402, 404 via the cloud-based system 100 or bypassing the cloud-based system 100, based on the criteria, e.g., on or off a trusted network, on or off a specific network, etc.

The client forwarding policy process 1200 includes providing a user interface to an administrator associated with a tenant of a cloud-based system, wherein the tenant has a plurality of users each having an associated user device (step 1202); receiving a plurality of client forwarding policies for the plurality of users, wherein each client forwarding policy of the client forwarding policies define rules related to how application requests from the plurality of users are forwarded for zero trust access (step 1204); and providing the rules to corresponding user devices of the plurality of users (step 1206).

The cloud-based system is configured to perform zero trust access between the plurality of users and a plurality of applications associated with the application requests. Each client forwarding policy specifies whether an application request bypasses the cloud-based system, is forwarded to the cloud-based system only when the application request is allowed for a user, and is forwarded to the cloud-based system. Each client forwarding policy specifies criteria for how the application requests are forwarded. Each client forwarding policy specifies criteria for how the application requests are forwarded, wherein the criteria include whether or not a user device is on a trusted network or not.

The client forwarding policy process 1200 can further include receiving a plurality of client forwarding policies for a same application with different criteria specifying how the application requests are forwarded with the plurality of client forwarding policies specified in a policy evaluation order (step 1208). The plurality of client forwarding policies can include accessing the same application through the cloud-based system when on a first network type and accessing the same application direct on a second network type, wherein the network types include any of a trusted network, an untrusted network, and a specifically defined network. The plurality of client forwarding policies can include accessing the same application through the cloud-based system when on a trusted network, and to prevent accessing the same application in all other situations.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming a server to perform steps of:
   providing a user interface to an administrator associated with a tenant of a cloud-based system, wherein the tenant has a plurality of users each having an associated user device;
   receiving a plurality of client forwarding policies for the plurality of users, wherein each client forwarding policy of the client forwarding policies define rules related to how application requests from the plurality of users are forwarded for zero trust access; and
   providing the rules to an application executing on corresponding user devices of the plurality of users based on policy evaluation order numbers configured for each rule of the defined rules, wherein the application executing on the user device is adapted to enforce the rules.

2. The non-transitory computer-readable storage medium of claim 1, wherein the cloud-based system is configured to perform zero trust access between the plurality of users and a plurality of applications associated with the application requests based on the rules, and wherein performing zero trust access includes forwarding requests between the user devices and connectors associated with the plurality of applications through the cloud-based system.

3. The non-transitory computer-readable storage medium of claim 1, wherein each client forwarding policy specifies whether an application request bypasses the cloud-based system, is forwarded through the cloud-based system to a connector associated with the application only when the application request is allowed for a user, and is forwarded through the cloud-based system to the connector associated with the application.

4. The non-transitory computer-readable storage medium of claim 3, wherein each client forwarding policy specifies criteria for how the application requests are forwarded.

5. The non-transitory computer-readable storage medium of claim 1, wherein each client forwarding policy specifies criteria for how the application requests are forwarded, wherein the criteria include whether or not a user device is on a trusted network or not.

6. The non-transitory computer-readable storage medium of claim 1, wherein the steps include
   receiving a plurality of client forwarding policies for a same application with different criteria specifying how the application requests are forwarded with the plurality of client forwarding policies specified in a policy evaluation order configured through the UI provided to the administrator.

7. The non-transitory computer-readable storage medium of claim 6, wherein the plurality of client forwarding policies include accessing the same application through the cloud-based system when on a first network type and accessing the same application direct on a second network type, wherein the network types include any of a trusted network, an untrusted network, and a specifically defined network.

8. The non-transitory computer-readable storage medium of claim 6, wherein the plurality of client forwarding policies include accessing the same application through the cloud-based system when on a trusted network, and to prevent accessing the same application in all other situations.

9. A method comprising:
   providing a user interface to an administrator associated with a tenant of a cloud-based system, wherein the tenant has a plurality of users each having an associated user device;
   receiving a plurality of client forwarding policies for the plurality of users, wherein each client forwarding policy of the client forwarding policies define rules related to how application requests from the plurality of users are forwarded for zero trust access; and providing the rules to an application executing on corresponding user devices of the plurality of users based on policy evaluation order numbers configured for each rule of the defined rules, wherein the application executing on the user device is adapted to enforce the rules.

10. The method of claim 9, wherein the cloud-based system is configured to perform zero trust access between the plurality of users and a plurality of applications associated with the application requests based on the rules, and wherein performing zero trust access includes forwarding requests between the user devices and connectors associated with the plurality of applications through the cloud-based system.

11. The method of claim 9, wherein each client forwarding policy specifies whether an application request bypasses the cloud-based system, is forwarded through the cloud-based system to a connector associated with the application only when the application request is allowed for a user, and is forwarded through the cloud-based system to the connector associated with the application.

12. The method of claim 11, wherein each client forwarding policy specifies criteria for how the application requests are forwarded.

13. The method of claim 9, wherein each client forwarding policy specifies criteria for how the application requests are forwarded, wherein the criteria include whether or not a user device is on a trusted network or not.

14. The method of claim 9, further comprising
receiving a plurality of client forwarding policies for a same application with different criteria specifying how the application requests are forwarded with the plurality of client forwarding policies specified in a policy evaluation order configured through the UI provided to the administrator.

15. The method of claim 14, wherein the plurality of client forwarding policies include accessing the same application through the cloud-based system when on a first network type and accessing the same application direct on a second network type, wherein the network types include any of a trusted network, an untrusted network, and a specifically defined network.

16. The method of claim 14, wherein the plurality of client forwarding policies include accessing the same application through the cloud-based system when on a trusted network, and to prevent accessing the same application in all other situations.

17. A server comprising:
one or more processors; and
memory storing instructions that, when executed, cause the one or more processors to
provide a user interface to an administrator associated with a tenant of a cloud-based system, wherein the tenant has a plurality of users each having an associated user device;
receive a plurality of client forwarding policies for the plurality of users, wherein each client forwarding policy of the client forwarding policies define rules related to how application requests from the plurality of users are forwarded for zero trust access; and
provide the rules to an application executing on corresponding user devices of the plurality of users based on policy evaluation order numbers configured for each rule of the defined rules, wherein the application executing on the user device is adapted to enforce the rules.

18. The server of claim 17, wherein the cloud-based system is configured to perform zero trust access between the plurality of users and a plurality of applications associated with the application requests based on the rules, and wherein performing zero trust access includes forwarding requests between the user devices and connectors associated with the plurality of applications through the cloud-based system.

19. The server of claim 17, wherein each client forwarding policy specifies whether an application request bypasses the cloud-based system, is forwarded through the cloud-based system to a connector associated with the application only when the application request is allowed for a user, and is forwarded through the cloud-based system to the connector associated with the application.

20. The server of claim 17, wherein each client forwarding policy specifies criteria for how the application requests are forwarded, wherein the criteria include whether or not a user device is on a trusted network or not.

* * * * *